(12) United States Patent
Sood et al.

(10) Patent No.: US 10,049,166 B2
(45) Date of Patent: *Aug. 14, 2018

(54) GEO-AWARE SPELLCHECKING AND AUTO-SUGGEST SEARCH ENGINES

(71) Applicant: YP LLC, Tucker, GA (US)

(72) Inventors: Sanjay Chand Sood, Claremont, CA (US); Sudheer Sahu, Encinitas, CA (US); Guobin He, San Diego, CA (US); Krishna Krishnamaneni, Culver City, CA (US); Vaibhav Chaudhary, Cupertino, CA (US); Kiran Sugana, Pasadena, CA (US); Nathan Lih Feng Diep, Glendora, CA (US)

(73) Assignee: YP LLC, D/FW Airport, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/238,009

(22) Filed: Aug. 16, 2016

(65) Prior Publication Data

US 2016/0357767 A1  Dec. 8, 2016

Related U.S. Application Data

(63) Continuation of application No. 14/157,792, filed on Jan. 17, 2014, now Pat. No. 9,443,036.

(Continued)

(51) Int. Cl.
 *G06F 17/30* (2006.01)
(52) U.S. Cl.
 CPC ...... *G06F 17/3087* (2013.01); *G06F 17/3053* (2013.01); *G06F 17/3097* (2013.01); *G06F 17/30241* (2013.01)
(58) Field of Classification Search
 CPC ............. G06F 17/3087; G06F 17/3053; G06F 17/30241; G06F 17/3097
 See application file for complete search history.

(56) References Cited

U.S. PATENT DOCUMENTS

| 7,349,950 B2 | 3/2008 | Stephens |
| 7,353,534 B2 | 4/2008 | Stephens |

(Continued)

FOREIGN PATENT DOCUMENTS

CA  2747081 A1  1/2012

OTHER PUBLICATIONS

United States Patent and Trademark Office, Notice of Allowance for U.S. Appl. No. 14/157,792, dated May 24, 2016, 9 pages, U.S.A.

*Primary Examiner* — Jorge A Casanova
(74) *Attorney, Agent, or Firm* — Mark E. Stallion; Greensfelder, Hemker & Gale PC

(57) ABSTRACT

Systems and methods for generating geo-aware auto-suggestions for searching are provided. Characters corresponding to user input for a search query to a searching service may be processed prior to completion of the search query. Information about a geographical location may be processed. A geographical area of interest and potential correction(s) may be identified. Geo-specific suggestions may be determined based on the search query and/or a selected correction. The geo-specific suggestions may correspond to one or more identified businesses located in the geographical area of interest. The determining the geo-specific suggestions may include identifying business listing information corresponding to the geographical area of interest and the search query and/or a selected correction. The geo-specific suggestions may be indicated as a user-selectable option to complete the search query in a search query field for a search engine and/or to submit to the search engine as a selected search query.

23 Claims, 18 Drawing Sheets

Related U.S. Application Data

(60) Provisional application No. 61/912,379, filed on Dec. 5, 2013, provisional application No. 61/759,194, filed on Jan. 31, 2013, provisional application No. 61/755,386, filed on Jan. 22, 2013.

(56) References Cited

U.S. PATENT DOCUMENTS

| | | |
|---|---|---|
| 7,774,003 B1 | 8/2010 | Ortega et al. |
| 7,966,003 B2 | 6/2011 | Longe et al. |
| 8,121,898 B2 | 2/2012 | Altberg et al. |
| 8,125,931 B2 | 2/2012 | Faber et al. |
| 8,396,054 B2 | 3/2013 | Altberg et al. |
| 8,612,414 B2 | 12/2013 | Lee et al. |
| 8,681,952 B2 | 3/2014 | Agarwal et al. |
| 8,856,115 B1 | 10/2014 | Huffman et al. |
| 9,235,654 B1 | 1/2016 | Gupta et al. |
| 9,443,036 B2 | 9/2016 | Sood et al. |
| 2007/0121847 A1 | 5/2007 | Faber et al. |
| 2007/0121848 A1 | 5/2007 | Faber et al. |
| 2007/0230374 A1 | 10/2007 | Altberg et al. |
| 2008/0313039 A1 | 12/2008 | Altberg et al. |
| 2009/0094221 A1 | 4/2009 | Cameron et al. |
| 2009/0249198 A1 | 10/2009 | Davis et al. |
| 2009/0281988 A1 | 11/2009 | Yoo |
| 2010/0318519 A1 | 12/2010 | Hadjieleftheriou et al. |
| 2011/0137882 A1 | 6/2011 | Weerasinghe |
| 2014/0207748 A1 | 7/2014 | Sood et al. |

GEO-AWARE SPELLCHECKING AND AUTO-SUGGEST SEARCH ENGINES

CROSS-REFERENCES TO RELATED APPLICATIONS

This application claims the benefit of U.S. Provisional Patent Application No. 61/912,379 filed Dec. 5, 2013, entitled "GEO-AWARE AUTO-SUGGEST SEARCH ENGINE," U.S. Provisional Patent Application No. 61/759,194 filed Jan. 31, 2013, entitled "DIFFERENTIATING SEARCH ENGINE,", U.S. Provisional Patent Application No. 61/755,386 filed Jan. 22, 2013, entitled "GEO-AWARE SPELLCHECKER," and is a continuation of, and claims the benefit of, U.S. Nonprovisional application Ser. No. 14/157,792, filed Jan. 17, 2014, the entire disclosures of which are hereby incorporated by reference for all purposes.

BACKGROUND

This disclosure relates in general to searching and, more specifically, but not by way of limitation, to an electronic search engine.

As value, use, access, and demand corresponding to information continue to increase, businesses demand more of the products and services they use than ever before. Companies are expected to compete to provide greater and greater levels of accuracy and more tailored service offerings. Companies configure and operate ever increasing numbers of computer systems to achieve this.

Searching for information with a computer can be frustrating. Effective searching in various areas can be difficult. There is a need for geo-aware services to provide fast and efficient access to information tailored to particular geographies.

BRIEF SUMMARY

Certain embodiments of the present disclosure relate generally to searching and, more specifically, but not by way of limitation, to geo-aware spellchecking and auto-suggest search engines.

In one aspect, a method for providing geo-aware auto-suggestions for a search engine is disclosed. One or more characters corresponding to user input for a search query to a searching service may be processed. The processing may be prior to completion of the search query. The searching service may include one or more information repositories retaining business listing information about a plurality of businesses. Information about a geographical location may be processed. The information about the geographical location may correspond to one or more of: automatically-gathered location information about the end-user computing device; user-entered location information gathered from the end user; location information previously associated with the end-user and/or the end-user computing device; and/or location information inferred from the one or more characters corresponding to the search query. A geographical area of interest may be identified at least partially based on the information about the geographical location. One or more potential corrections to at least a portion of the search query may be identified based at least in part on the one or more characters corresponding to the search query and the geographical area of interest. One or more geo-specific suggestions may be determined at least partially based on the at least the portion of the search query and/or a selected correction of the one or more potential corrections to the at least the portion of the search query. The one or more geo-specific suggestions may correspond to one or more identified businesses located in the geographical area of interest. The determining the one or more geo-specific suggestions may include identifying a set of business listing information corresponding to the geographical area of interest and the at least the portion of the search query and/or a selected correction of the one or more potential corrections to the at least the portion of the search query. Indication may be caused of at least one of the one or more geo-specific suggestions as a user-selectable option to complete the search query in a search query field for a search engine and/or submission of the at least one of the one or more geo-specific suggestions to the search engine as a selected search query.

In another aspect, a system to provide geo-aware auto-suggestions for a search engine is disclosed. One or more network interfaces may be configured to provide access to one or more networks. One or more processors may be coupled to the one or more network interfaces, the one or more processors to execute instructions to perform one or a combination of the following. One or more characters corresponding to user input for a search query to a searching service may be processed. The processing may be prior to completion of the search query. The searching service may include one or more information repositories retaining business listing information about a plurality of businesses. Information about a geographical location may be processed. The information about the geographical location may correspond to one or more of: automatically-gathered location information about the end-user computing device; user-entered location information gathered from the end user; location information previously associated with the end-user and/or the end-user computing device; and/or location information inferred from the one or more characters corresponding to the search query. A geographical area of interest may be identified at least partially based on the information about the geographical location. One or more potential corrections to at least a portion of the search query may be identified based at least in part on the one or more characters corresponding to the search query and the geographical area of interest. One or more geo-specific suggestions may be determined at least partially based on the at least the portion of the search query and/or a selected correction of the one or more potential corrections to the at least the portion of the search query. The one or more geo-specific suggestions may correspond to one or more identified businesses located in the geographical area of interest. The determining the one or more geo-specific suggestions may include identifying a set of business listing information corresponding to the geographical area of interest and the at least the portion of the search query and/or a selected correction of the one or more potential corrections to the at least the portion of the search query. Indication may be caused of at least one of the one or more geo-specific suggestions as a user-selectable option to complete the search query in a search query field for a search engine and/or submission of the at least one of the one or more geo-specific suggestions to the search engine as a selected search query. One or more storage media may be coupled to the one or more processors to retain the instructions.

In yet another aspect, one or more non-transitory machine-readable media have machine-readable instructions thereon which, when executed by one or more computers or other processing devices, cause the one or more computers or other processing devices to perform one or a combination of the following. One or more characters corresponding to user input for a search query to a searching service may be processed. The processing may be prior to completion of the search query. The searching service may include one or more information repositories retaining business listing information about a plurality of businesses.

Information about a geographical location may be processed. The information about the geographical location may correspond to one or more of: automatically-gathered location information about the end-user computing device; user-entered location information gathered from the end user; location information previously associated with the end-user and/or the end-user computing device; and/or location information inferred from the one or more characters corresponding to the search query. A geographical area of interest may be identified at least partially based on the information about the geographical location. One or more potential corrections to at least a portion of the search query may be identified based at least in part on the one or more characters corresponding to the search query and the geographical area of interest. One or more geo-specific suggestions may be determined at least partially based on the at least the portion of the search query and/or a selected correction of the one or more potential corrections to the at least the portion of the search query. The one or more geo-specific suggestions may correspond to one or more identified businesses located in the geographical area of interest. The determining the one or more geo-specific suggestions may include identifying a set of business listing information corresponding to the geographical area of interest and the at least the portion of the search query and/or a selected correction of the one or more potential corrections to the at least the portion of the search query. Indication may be caused of at least one of the one or more geo-specific suggestions as a user-selectable option to complete the search query in a search query field for a search engine and/or submission of the at least one of the one or more geo-specific suggestions to the search engine as a selected search query.

In various embodiments, the processing may be prior to user entry of additional characters subsequent to the one or more characters corresponding to the search query. In various embodiments, the user-selectable option may be presented as a type-ahead user-selectable option in the search query field. In various embodiments, the determining the one or more geo-specific suggestions may further include determining a relevancy of the at least the portion of the search query to the geographical area of interest and determining one or more relevancies of the one or more potential corrections to the geographical area of interest. In various embodiments, the determining the one or more geo-specific suggestions may further include determining assigning one or more relevancy scores to the at least the portion of the search query and to the one or more potential corrections.

In various embodiments, at least one of the one or more geo-specific suggestions may be based at least in part on the at least the portion of the search query and may be indicated a first user-selectable option to complete the search query; and at least one of the one or more geo-specific suggestions may be based at least in part on the one or more potential corrections to the at least the portion of the search query, and may be indicated a second user-selectable option to complete the search query. In various embodiments, it may be determined whether to generate a list of search results for display or to select for display a page that corresponds to a single search result, the determination being at least partially based on a whether a selection corresponding to the at least one of the one or more geo-specific suggestions is made.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

Figure 1:
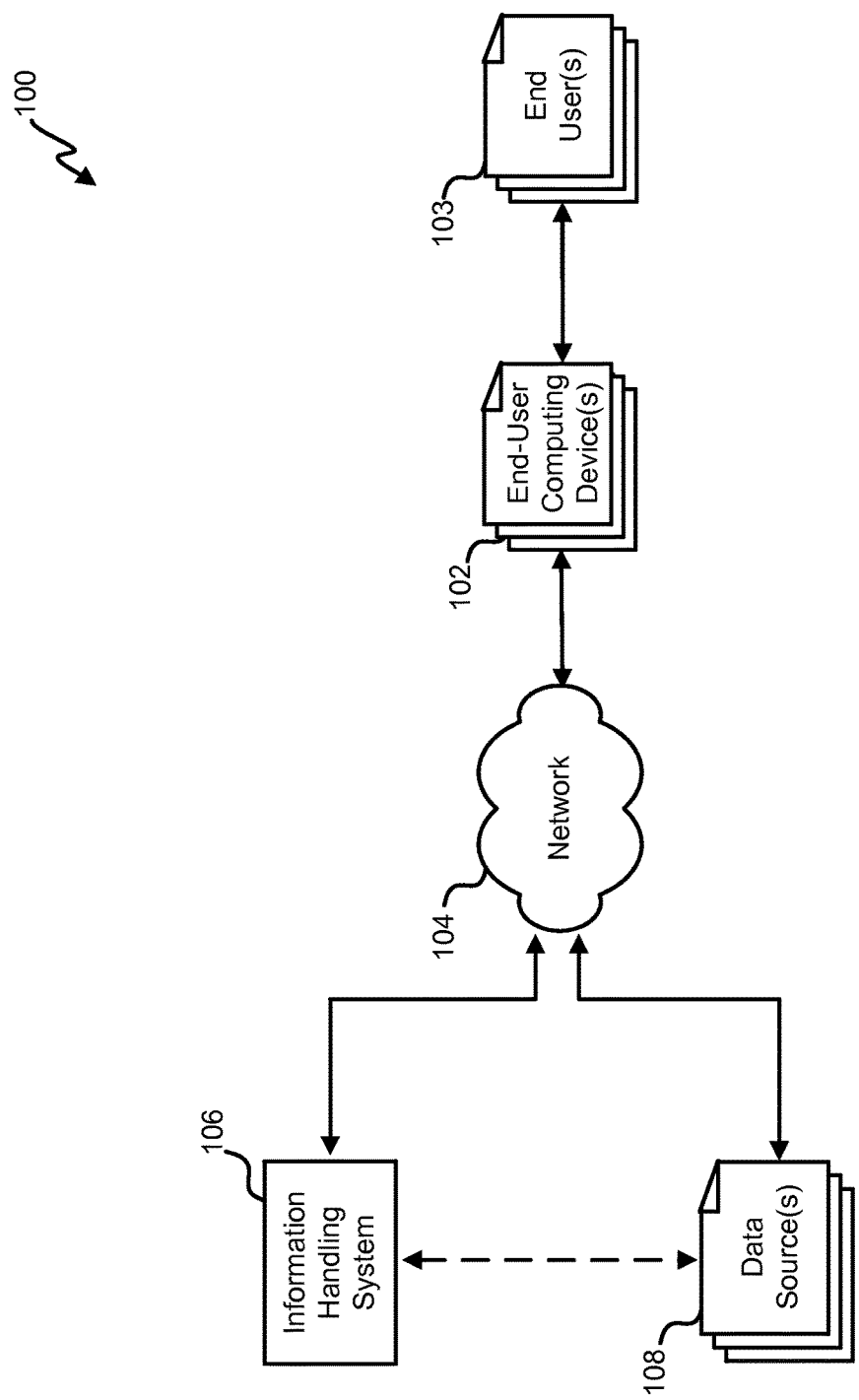
FIG. 1 depicts a high-level block diagram of a system, in accordance with certain embodiments of the present disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides preferred exemplary embodiment(s) only, and is not intended to limit the scope, applicability or configuration of the invention. Rather, the ensuing description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments maybe practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Certain embodiments of the present disclosure may provide a geo-aware autosuggest search system. Certain embodiments may provide a geo-aware autosuggest search engine. As a user types a search query, the geo-aware autosuggestion feature may provide type-ahead/autocomplete suggestion(s) that are relevant to a geography of interest, such that the user will see the geographically relevant type-ahead/autocomplete suggestion(s), which may be presented with user-selectable option(s) to accept or reject the suggestion(s). The geo-aware autosuggestion feature may make query input easier, allowing a query input without requiring a user to type the whole query string. This is useful for query input on desktop devices, but particularly useful for query input on mobile devices because of cumbersome input methods. Certain embodiments may provide geo-aware autosuggest search features via a website. Certain embodiments may provide a mobile application configured to run on a mobile computing device in order facilitate geo-aware autosuggest search features.

Various embodiments will now be discussed in greater detail with reference to the accompanying figures, beginning with FIG. 1.

FIG. 1 depicts a high-level block diagram of a system 100, in accordance with certain embodiments of the present disclosure. The system 100 allows for interaction between one or more computing devices 102 of one or more end users 103 and an information handling system 106. As depicted, the computing device 102 may be communicatively coupled or couplable to a network 104.

The network 104 may be any suitable means to facilitate data transfer in the system 100. In various embodiments, the network 104 may be implemented with, without limitation, one or more of the Internet, a wide area network (WAN), a local area network (LAN), a wireless local area network (WLAN), a metropolitan area network (MAN), a cellular network, such as through 4G, 3G, GSM, etc., another wireless network, a gateway, a conventional telephone network, or any other appropriate architecture or system that facilitates the communication of signals, data, and/or message. The network 104 may transmit data using any suitable communication protocol. The network 104 and its various components may be implemented using hardware, software, and communications media such wires, optical fibers, microwaves, radio waves, and other electromagnetic and/or optical carriers; and/or any combination of the foregoing. The computing devices 102 and the information handling system 106 may be coupled to the network 104 via any suitable communication paths that support the communication protocol(s) used in the various embodiments.

The information handling system 106 may facilitate searching of one or more information repositories in response to information received over the network 104 from the computing devices 102. In various embodiments, the information handling system 106 may include any device or set of devices configured to process, send, receive, retrieve, detect, generate, compute, organize, categorize, qualify, store, display, present, handle, or use any form of information or data suitable for the embodiments described herein.

The information handling system 106 may include a single computing device or multiple computing devices, which may be implemented in or with a distributed computing and/or cloud computing environment. The information handling system 106 may include one or more processing resources communicatively coupled to one or more storage media, random access memory (RAM), read-only memory (ROM), and/or other types of memory. The information handling system 106 may include any one or combination of various input and output (I/O) devices, network ports, and display devices.

In certain embodiments, the information handling system 106 may be communicatively coupled or couplable to one or more data sources 108. The one or more data sources 108 may include any suitable source of data. In various embodiments, the one or more data sources 108 may include one or more of a database, a website, any repository of data in any suitable form, and/or a third party. With some embodiments, the data sources 108 may include one or more mobile computing device locator services that provide information regarding the location of one or more computing devices 102.

In various embodiments, the data from the one or more data sources 108 may be retrieved and/or received by the information handling system 106 via the network 104 and/or through any other suitable means of transferring data. For example, in some embodiments, the information handling system 106 and the data sources 108 could use any suitable means for direct communication, as depicted. According to certain embodiments, data may be actively gathered and/or pulled from one or more data sources 108, for example, by accessing a third party repository and/or by "crawling" various repositories. The data pulled and/or pushed from the one or more data sources 108 may be made available by the information handling system 106 for user(s) 103 of the computing device(s) 102. In alternative embodiments, data from the one or more data sources 108 may be made available directly to the computing device(s) 102.

Figure 2:
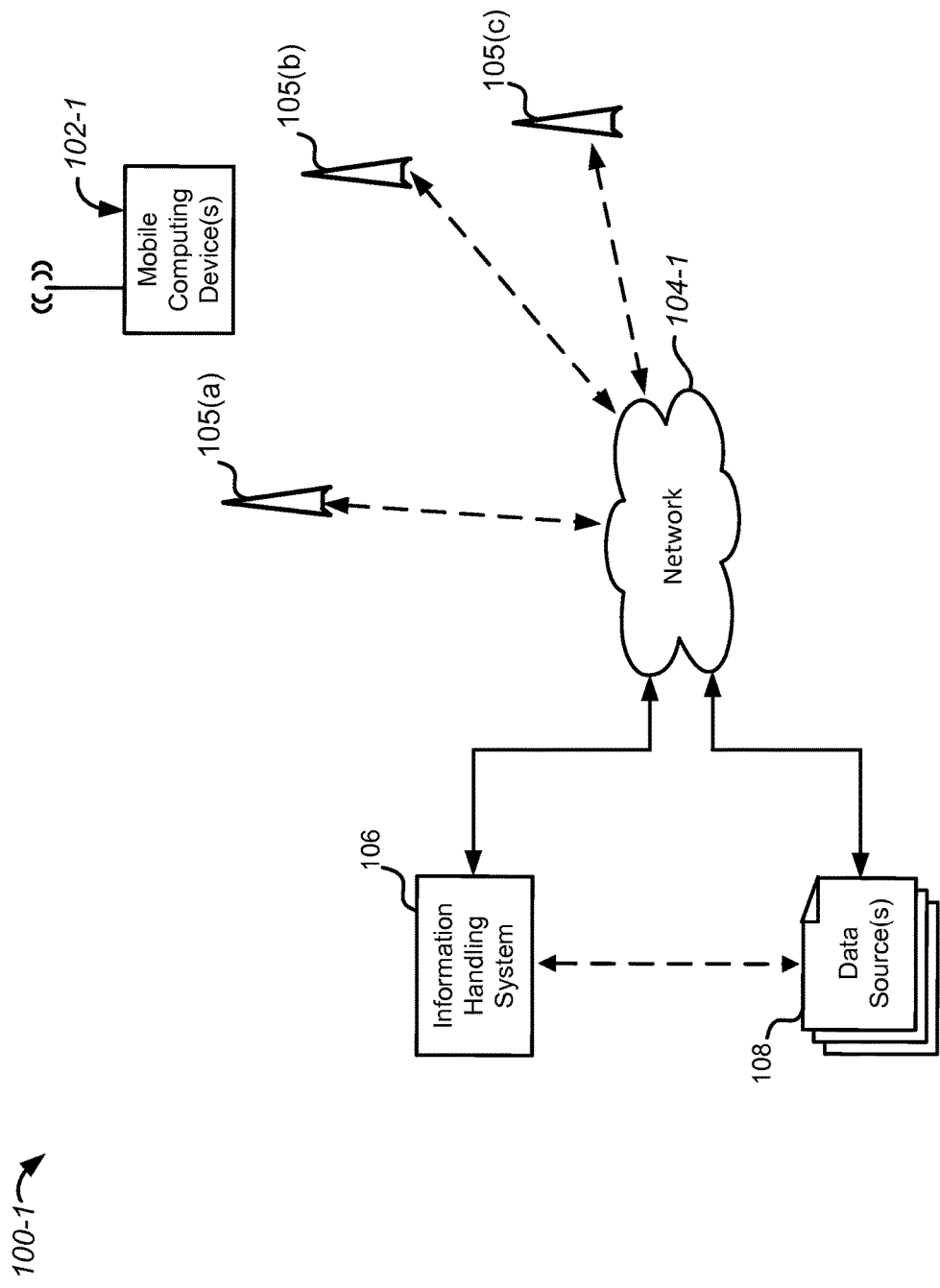
FIG. 2 shows a diagram of a system where access point(s) may be used in obtaining location information for a mobile computing device, in accordance with certain embodiments of the present disclosure.

FIG. 2 shows a diagram of a system 100-1 where access point(s) may be used in obtaining location information for the mobile computing device 102 as described further herein, in accordance with certain embodiments of the present disclosure. In certain embodiments, such location information may be used as a basis for providing geo-specific services described further herein. The system 100-1 may correspond to the system 100 for certain embodiments where the end-user computing devices 102 are mobile computing devices 102-1. The mobile computing device(s) 102-1 may access the network 104-1 through a wireless link to an access point. For example, the mobile computing device(s) 1021 may access the network 104-1 through one or more of access point 105(*a*), access point 105(*b*), access point 105(*c*), and/or any other suitable access point(s). The access points 105 may be of any suitable type or types. For example, an access point 105 may be a cellular base station, an access point for wireless local area network (e.g., a WiFi access point), an access point for wireless personal area network (e.g., a Bluetooth access point), etc. The access point 105 may connect the mobile computing device 102 to the network 104-1, which may include the Internet, an intranet, a local area network, a public switched telephone network (PSTN), private communication networks, etc.

Figure 3:
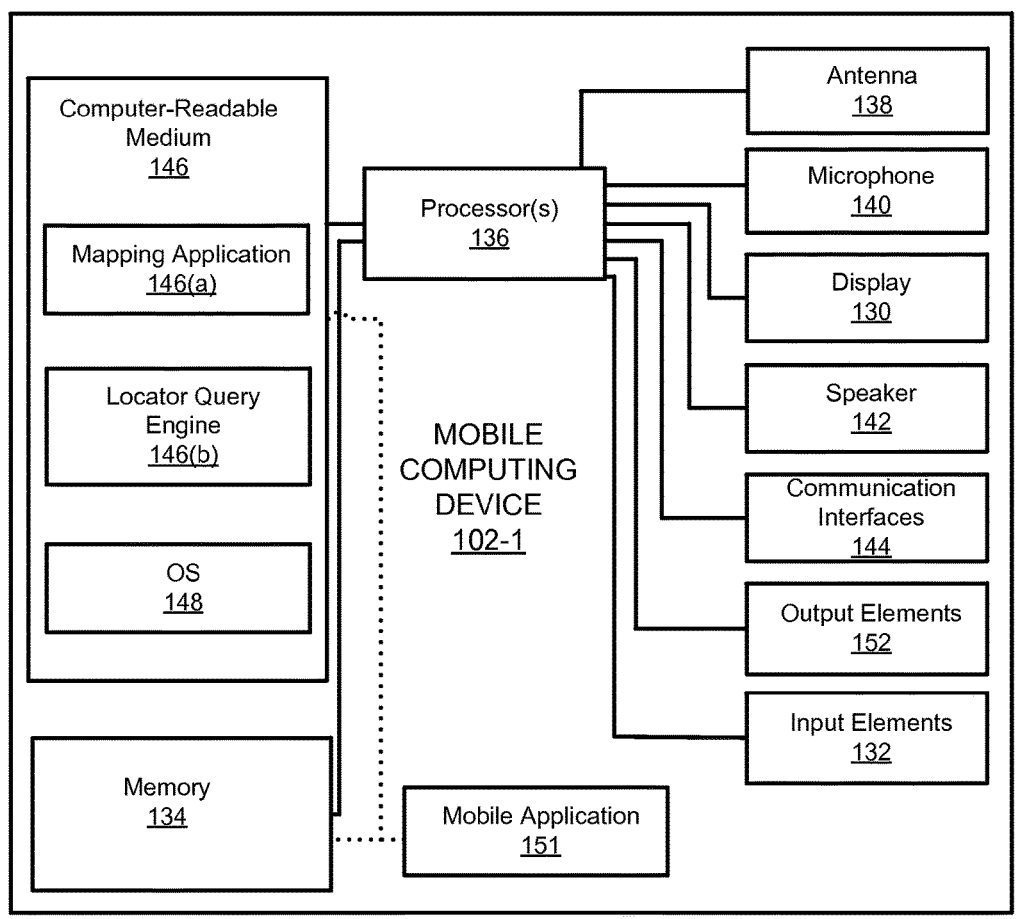
FIG. 3 is a functional block diagram of a computing device, which may be a mobile computing device, in accordance with certain embodiments of the present disclosure.

FIG. 3 is a functional block diagram of a computing device 102-1, which may be a mobile computing device 102-1, in accordance with certain embodiments of the present disclosure. In various embodiments, the computing device 102-1 may facilitate one or more gathering of location information, provision of search services, gathering of query information, and/or provision of geo-specific services described further herein. In some embodiments, the mobile computing device 102 may be provided with a mobile application 151 configured to run on the mobile computing device 102 and transform the mobile computing device 102 into a local guide to facilitate communications with advertisers at least partially based on location. The mobile computing device 102 may be any portable device suitable for sending and receiving information over a network in accordance with embodiments described herein. For example without limitation, in various embodiments, the mobile computing device 102 may include one or more variously referenced as a mobile phone, a cellular telephone, a smartphone, a handheld mobile device, a tablet computer, a web pad, a PDA, a notebook computer, a handheld computer, a laptop computer, a vehicle computer, and/or the like.

As shown in FIG. 3, the mobile computing device 102 includes a display 130 and input elements 132 to allow a user to input information into the computing device 102. By way of example without limitation, the input elements 132 may include one or more of a keypad, a trackball, a touchscreen, a touchpad, a pointing device, a microphone, a voice recognition device, or any other appropriate mechanism for the user to provide input. The mobile computing device 102 includes a memory 134 communicatively coupled to one or more processors 136 (e.g., a microprocessor) for processing the functions of the mobile computing device 102. The mobile computing device 102 may include at least one antenna 138 for wireless data transfer.

The mobile computing device 102 may also include a microphone 140 to allow a user to transmit his/her voice through the mobile computing device 102, and a speaker 142 to allow the user to hear voice communication, music, etc. In addition, the mobile computing device 102 may include one or more interfaces in addition to the antenna 138, e.g., a wireless interface coupled to an antenna. The communications interfaces 144 can provide a near field communication interface (e.g., contactless interface, Bluetooth, optical interface, etc.) and/or wireless communications interfaces capable of communicating through a cellular network, such as GSM, or through Wi-Fi, such as with a wireless local area network (WLAN). Accordingly, the computing device 102 may be capable of transmitting and receiving information wirelessly through both short range, radio frequency (RF) and cellular and Wi-Fi connections.

Additionally, the mobile computing device 102 can be capable of communicating with a GPS in order to determine to location of the mobile computing device 102. The antenna 138 may include a cellular antenna (e.g., for sending and receiving cellular voice and data communication, such as through a network such as a 4G or 4G network), and interfaces 144 may include one or more local communication interfaces. The antenna 138 may include GPS receiver functionality. In other embodiments contemplated herein, communication with the mobile computing device 102 may be conducted with a single antenna configured for multiple purposes (e.g., cellular, transactions, GPS, etc.), or with further interfaces (e.g., three, four, or more separate interfaces).

The mobile computing device 102 can also include one or more computer-readable media 146 coupled to the processor(s) 136, which stores application programs and other computer code instructions for operating the device, such as an operating system (OS) 148. The mobile application 151 may be stored in the memory 134 and/or computer-readable media 146. The computer-readable medium 146 can include a mapping application. The mobile application may be provided in any suitable way. For non-limiting example, the mobile application may be made available from an information handling system over a network or from any website for download to the mobile computing device. Alternatively, the mobile application may be pre-installed on the mobile computing device. The mobile application may be stored in the memory 134 and/or computer-readable media 146.

Figure 4:
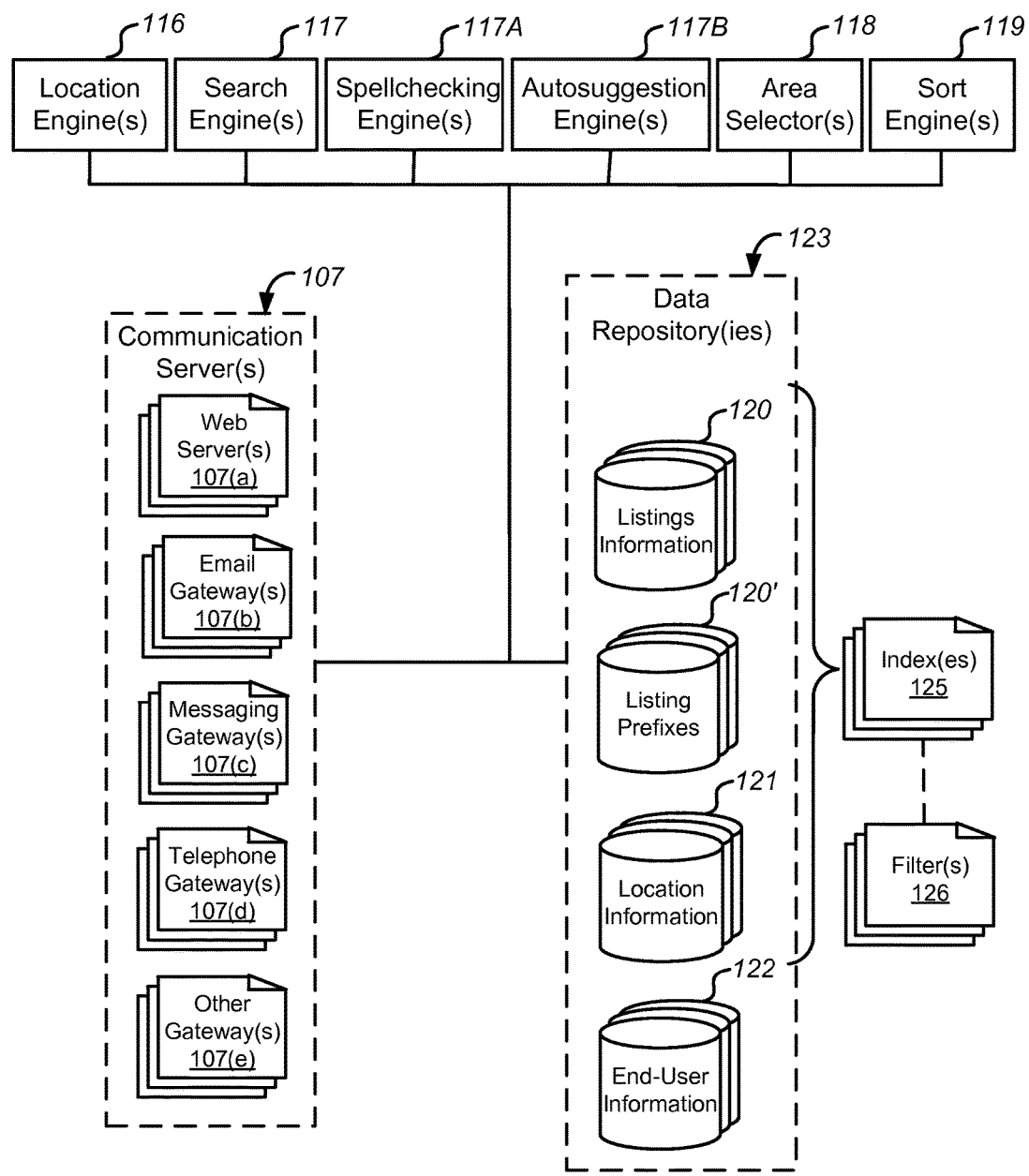
FIG. 4 shows a high-level block diagram of a system that may correspond to the system, where an information handling system is shown in more detail, in accordance with certain embodiments of the present disclosure.

FIG. 4 shows a high-level block diagram of a system that may correspond to the system 100, where the information handling system 106 is shown in more detail, in accordance with certain embodiments of the present disclosure. While engines, repositories, and other components are described separately herein, it should be appreciated that the components may be combined and/or implemented differently in any combination to provide certain features in various embodiments. In various embodiments, different processes running on one or more shared computers may implement some of the components.

As depicted in FIG. 4, the information handling system 106-1 may include one or more communication servers 107. The one or more communication servers 107 may include one or more web servers 107(*a*), one or more email gateways 107(*b*), one or more instant messaging gateways 107(*c*), one or more telephone gateways 107(*d*), one or more other gateways 107(*e*), such as television gateways, and/or one or more other types of servers, such as an application gateway (not shown) to interface with different servers. Some embodiments may use one type of communication server 107, such as a web server 107(*a*), to receive search requests and another type of communication server 107 to provide the search results. Some embodiments may use different types of communication servers 107 to service different types of computing devices 102.

In some embodiments, a web server 107(*a*) may communicate with a computing device 102 via HyperText Transfer Protocol (HTTP) and/or other types of communication protocols, such as File Transfer Protocol (FTP), Wireless Application Protocol (WAP), etc. A web server 107(*a*) may provide static web pages, dynamic web pages, and/or web services. In some embodiments, a web server 107(*a*) may provide web applications to a computing device 102 for execution in a web browser running on the computing device 102; and the web applications may include scripts, such as Java, JavaScript, etc., for execution within an isolated environment in a browser. In some embodiments, the web server 107(*a*) may provide rich-client applications to the computing device 102; and the rich-client application may be programmed in traditional programming languages to have full access to functions of the operating system running on the computing device 102.

In some embodiments, the communication servers 107 provide a user interface for user interaction with listings. For example, the web servers 107(*a*) may provide a user interface via static web pages, dynamic web pages, and/or web services, etc. For example, the web servers 107(*a*) may provide the listings 120 with links to detail information pages of the listings 120, such as a map, business hours, driving directions, etc. The web servers 107(*a*) may provide user interfaces for the users to rate the listings 120, provide reviews, view reviews from other users, etc. The web servers 107(*a*) may provide user interfaces to make reservations or to make purchases via the listings 120. The web servers 107(*a*) can track various different types of user interactions with the listings to determine or estimate the level of user interest in the listings. The web servers 107(*a*) may provide rich client applications for execution in the mobile computing device to provide the user interfaces.

The communications server(s) 107 may be communicatively coupled to one or more of a location engine(s) 116, a search engine(s) 117, a geo-aware spellchecking engine(s) 117A, a geo-aware autosuggestion engine(s) 117B, an area selector(s) 118, and/or a sort engine(s) 119 to process the search request and present search results based on the information stored in one or more data repositories 123. The one or more data repositories 123 may include listings information 120 about business entities or public end-user information, or other types of searchable end-user information. The one or more listings information repositories 120 may retain any local listings information suitable for embodiments of this disclosure, such as business, product, and service information. In certain embodiments, the local listings information may correspond to directory information of the kind that may be available via Yellow Pages services and the like.

Listings 120 of businesses or people, such as restaurants, car dealers, retailer locations, advertisers, gas stations, parking lots, plumbers, and the like, may have street addresses or other location parameters, such as longitude and latitude coordinates, stored as locations in one or more location information repositories 121. The listings 120 may include addresses, telephone numbers, advertisements, announcements, and/or end-user information, etc. Listings 120 may be associated with locations 121. The locations 121 may be part of the listings 120, or associated with the listings 120. In some embodiments, the listings 120 include information related to business entities at corresponding locations 121. The entities may be businesses or people. Some of the entities may be advertisers who pay advertisement fees to promote their listings 120. Some of the entities may be non-advertisers who have free listings 120. In some embodiments, the listings 120 may be accessible to the public or to registered members.

In some embodiments, the data repository(ies) 123 may include one or more end-user information repositories 122. In some embodiments, a computing device 102 may store end-user information 122. In some embodiments, both the computing device 102 and the online data repository(ies) 123 store the end-user information 122 for a particular end user 103. In some embodiments, when there is a data communication connection between the computing device 102 and the online data repository(ies) 123, the computing device 102 and the online data repository(ies) 123 may synchronize their copies of the end-user information 122 for the end user 103. The end-user information 122 may be associated with the corresponding end users 103. In some embodiments, an end user 103 may create corresponding end-user information 122. The web servers 107(*a*) may generally limit the access to the end-user information 122 to those who created the corresponding end-user information 122.

In various embodiments, the data repository(ies) 123 may be implemented in various ways. For example, one or more data processing systems may store the information about the listings 120, the locations 121, and the end-user information 122. For example, one or more relational or object-oriented databases, or flat files on one or more computers or networked storage devices, may store the information about the listings 120, the locations 121, and the end-user information 122. In some embodiments, a centralized system stores the information about the listings 120, the locations 121, and the end-user information 122; alternatively, a distributed/cloud system, network-based system, such as being implemented with a peer-to-peer network, or Internet, may store the information about the listings 120, the locations 121, and the end-user information 122.

The information handling system 106 may include one or more processors communicatively coupled to one or more memories. The information handling system 106 may include one or more network interfaces communicatively coupled to one or more processors. The one or more network interfaces may include any suitable input/output module(s) or other system(s)/device(s) operable to serve as one or more interfaces between the information handling system 106 and the network 104. The information handling system 106 may use the one or more network interfaces to communicate over the network 104 using any suitable transmission protocol(s) and/or standard(s).

In various embodiments, one or more of the location engine 116, the search engine 117, the geo-aware spellchecking engine 117A, the geo-aware autosuggestion engine 117B, the area selector 118, the sort engine 119, and/or other modules may be stored in the one or more memories and may include one or more software applications, executable with the processors, for receiving and processing data requests. In some embodiments, one or more of the location engine 116, the search engine 117, the geo-aware spellchecking engine 117A, the geo-aware autosuggestion engine 117B, the area selector 118, the sort engine 119, and/or other modules may be servers communicating with the communication server(s) 107. The server communication may be over a network, such as a local area network, a wide area network, an intranet, Internet, and/or the like. Any one or combination of the various servers may run on common or separate computers. In some embodiments, there may be one or more layers of application servers between the communication server 107 and the data repository(ies) 123 to process the business logic and data access of the rich client applications. Alternatively, application servers may be integrated with the communication servers 107, such as the web servers 107(*a*). Certain embodiments are not limited to a particular type of connections among the communication servers 107, the location engine 116, the search engine 117, the geo-aware spellchecking engine 117A, the geo-aware autosuggestion engine 117B, the area selector 118, the sort engine 119, the data repository(ies) 123, and/or other modules.

In some embodiments, one computer system implements one or more of the servers 107, the location engine 116, the search engine 117, the geo-aware spellchecking engine 117A, the geo-aware autosuggestion engine 117B, the area selector 118, and the sort engine 119. Alternatively, different processes running on one or more shared computers may implement some of the components 107, 116, 117, 117A, 117B, 118, and/or 119. For example, one computing module, thread, or process may implement multiple of the components. In some embodiments, special purpose data processing systems implement the one or more of the components, such as using Application-Specific Integrated Circuit (ASIC) or Field-Programmable Gate Array (FPGA). In some embodiments, processes running according to software instructions on general purpose data processing systems, such as general purpose personal computers or server computers, can implement the components. Thus, the implementations are not limited to hardware, software, or particular combinations of hardware and software.

One or more of the location engine 116, the search engine 117, the spellchecking engine 117A, the geo-aware spellchecking engine 117A, the geo-aware autosuggestion engine 117B, the sort engine 119, and/or other modules may be configured to perform any of the steps of methods according to the present disclosure. In some embodiments, the location engine(s) 116 may include one or more engines and may use GPS coordinates, cellular tower triangulation techniques, Wi-Fi-based location information, carrier-provided location information, and/or other location determination systems to identify a location of the computing device 102. In some embodiments, the location engine 116 determines a location of interest to the end user 103 related to a search request. In some embodiments, the location engine 116 determines a location of interest to the end user 103 related to a phone call initiated with the computing device 102. The location of interest may be based on a location of the computing device 102. In some embodiments, the end user 103 may explicitly specify the location of interest in a search request; and the location engine 116 extracts the location of interest from the search request. In some embodiments, a location of interest may be based on end-user information 122 stored for a particular end user 103 and associated with identification information of the end user 103 or the computing device 102. In some embodiments, the end user 103 may specify some or all of the end-user information 122.

In some embodiments, the location engine 116 may automatically identify the location of interest based on determining the current location of the computing device 102 that is used to submit a search request and/or initiate a phone call. For example, the location engine 116 may determine the location of the computing device 102 based on a connection point the computing device 102 used to access the network 104 (e.g., based on the location of a wireless network access point, a base station of a cellular communication system, or a connection point to a wired network). In some embodiments, the computing device 102 automatically determines its current position (e.g., via a satellite positioning system, or a cellular positioning system) and transmits the determined or estimated position to the web server 107(*a*) with the search request, or provides the position in response to a request from the location engine 116.

In some embodiments, the search engine 117 may retrieve listings 120 from the data repository(ies) 123 according to a search request. In some embodiments, the search engine 117 may include or otherwise be configured to use the geo-aware spellchecking engine 117A, and/or the geo-aware autosuggestion engine 117B. In some embodiments, the geo-aware spellchecking engine(s) 117A may be used with the string corresponding to the search request to identify corrections for misspellings in search strings and/or to otherwise account for spelling variations in order to provide results with a greater degree of relevance. In some embodiments, the geo-aware spellchecking engine(s) 117A may be used with the string corresponding to the search request to identify corrections for misspellings in search strings and/or to otherwise account for spelling variations in order to provide results with a greater degree of relevance. In some embodiments, the geo-aware autosuggestion engine 117B may be used with the geo-aware spellchecking engine(s) 117A, may include the geo-aware spellchecking engine(s) 117A, and/or may be otherwise configured to account for geo-aware spelling variations and to provide such geo-aware features in conjunction with the geo-aware suggestion features described herein.

In some embodiments, the sort engine 119 may rank the listings 120 in the search results according to the distance between the location of interest and the locations 121 of the listings 120, or according to current levels of user interest in the retrieved listings 120. The web servers 107(a) may track various different types of user interactions with the listings 120 to determine or estimate the level of user interest in the listings 120. The sort engine 119 may rank the listings 120 according to other criteria, in accordance with other embodiments described herein. In various embodiments, the search engine 117 may be configured to search for and/or correlate user data, advertiser data, location data, and/or other data, in accordance with various embodiments described herein. In some embodiments, the sort engine 119 may be used to provide sorting features in conjunction with the geo-aware suggestion features described herein.

In various embodiments, the area selector 118 may be configured to select areas of interest, in accordance with various embodiments described herein. In some embodiments, the area selector 118 may select a first geographic area based on the location of interest identified by the location engine 116. The search engine 117 may then retrieve a first set of listings 120 that have locations 121 within the selected first geographic area and that satisfies the search criteria. The first geographic area could correspond to a service area in some embodiments. In some embodiments, the search engine 117 may search for listings 120 in a target area to obtain a set of search results; the area selector 118 may select geographic areas and selects groups of results that are within the selected geographic areas respectively. In some embodiments, the geo-aware autosuggestion engine 117B may be used with the area selector 118, may include the area selector 118, and/or may be otherwise configured to provide for such area selection features in conjunction with the geo-aware suggestion features described herein.

The computing device 102 may be any data processing device suitable for embodiments disclosed herein. In various embodiments, the computing device 102 could be one or more of a notebook computer, a personal computer, a workstation, a network computer, a personal digital assistant (PDA), a mobile phone, a cellular phone, a television set with or without a set-top box, a game console, an electronic kiosk, microprocessor-based or programmable consumer electronics, and/or the like. Some embodiments include a landline phone that may not be a computing device.

In some embodiments, the computing device 102 includes a web browser which allows the end user 103 to submit a search request to one of the web servers 107(a) for location dependent information, such as a listing 122 of businesses or people, such as restaurants, car dealers, retailer locations, advertisers, gas stations, parking lots, plumbers, and/or the like. Alternatively or additionally in some embodiments, the computing device 102 includes a mobile application which allows the end user 103 to submit a search request to one of the web servers 107(a) for location dependent information. Alternatively, the computing device 102 may provide the search request via other communication channels, such as email, short message service (SMS), instant messaging (IM), telephone connection, etc. For example, the computing device 102 may provide the search request to an email gateway 107(b) via email, or to an IM gateway 107(c) via instant messaging, or to a telephone gateway 107(c) via a telephone call, or to a television gateway 107(e) via an interactive television system. Some embodiments may use other types of gateways, such as gateways for SMS. Thus, the disclosure is not limited to the examples or combinations illustrated in FIG. 4.

Certain embodiments may provide for associating listing information 120, location information 121, and prefixes 120' for the listings. One or more indexes 125 for the associated listing information 120, location information 121, and prefixes 120' may be built, updated, and maintained in some embodiments. In some embodiments, one or more inverted indexes 125 may be implemented. The one or more inverted indexes 125 may store mapping for the associated listing information 120, location information 121, and prefixes 120'. The one or more inverted indexes 125 may allow for faster information retrieval with search engine(s) 117 according certain embodiments.

In some embodiments, particular words may be stored in indexes 125. In some embodiments, each word may be linked to one or more documents, collections, files, fields, database structure/elements, or other fauns of listing information that contain those words. In some embodiments, one or more inverted lists for each n-gram corresponding to the words may be created and may be associated with the words. For example, consider the string of "Max Bar & Grill," which can be decomposed into 2-gram sets such as {'ma', 'ax', 'x#', '#b', . . . } where # stands for a space; into 3-gram sets such as {'max', 'ax#', 'x#b', . . . 1; and/or into other n-grams sets. In some embodiments, the decomposition may include word-level decomposition. Using the same example string of "Max Bar & Grill," various n-gram sets could include {'max', 'bar', 'grill', 'max bar', 'bar &', '& gril', 'max grill', 'bar & grill', . . . }, for example.

An inverted list for a given n-gram may include any and/or all instances of strings from a plurality of strings that contain the n-gram. In some embodiments, a list may include identifiers of strings, in lieu of actual strings, for mapping to actual strings. This may improve efficiency. The string identifiers could be unique identifiers.

In some embodiments, the indexes 125 may allow for approximate string matching at least partially based on decomposition of strings, such as into n-grams or words, and building inverted lists based on the decompositions. In some embodiments, inverted lists may be based on tokens or other identifiers associated with the n-grams or words. In some embodiments, similarity of strings may be measured in terms of similarity of the respective n-grams, words, and/or identifiers. In some embodiments, the indexes 125 may include a multiplicity of possible variations for various strings. For example, the example string of "Max Bar & Grill" can have multiple corresponding strings at the word level, such as "mac's bar & grill," "mack's bar & grill," "mac's bar 'n grill," "max bar 'n grill," "macs bar & grill," "maxbar grill," "maxbargrill," etc. Thus, misspellings and spelling variations may be anticipated. Stemming may be used to allow for variations such as "sport bar" instead of "sports bar." Including misspellings and spelling variations may allow for the capture of the relevant information. The same example string of "Max Bar & Grill" can have multiple corresponding strings at the character level for various n-gram sets in some embodiments. Accordingly, the indexes 125 may allow for prefix matching that is not too strict and, more generally, the indexes 125 may allow for fuzzy search engine capabilities.

Various embodiments may employ various similarity measures that may be tailored to facilitate linking to the indexes and/or retrieval of documents and/or listing information retained in any other suitable form, collection, file, field, database structure/element, etc. For example, TF/IDF (term frequency/inverse document frequency) may be used to assess the significance of a particular word/n-gram with respect to a particular document and/or with respect to particular strings. The IDF for each n-gram in one or more strings, such as strings within a database, dataset, or table within a database, may be determined. The IDF of a token or string is the inverse of the total number of times that this token or string appears in a data collection, such as a database. In some embodiments, an IDF may indicate a weight for weighted similarity measures.

In some embodiments, the search engine may employ similarity measures between multiple strings to allow for fuzzy searching. The search engine may process one or more characters corresponding to user input of a search string and parse the search string into sets of n-grams compared the search string with index information. For example, the characters of an incomplete user-entered search string could be "macs b". The characters could be processed and decomposed into n-grams similar to the examples given above. The sets of characters could be compared to index entries to assess similarity using any suitable algorithm. Some embodiments may identify intersections between multiple sets and assigned a similarity score based on the extent of n-gram intersections between the search string and index entries, with a greater extent of an intersection of common characters indicating a greater degree of potential similarity between corresponding sets. For example, the search string "macs b" may be identified as a having a high extent of intersection with one or more index entries for "Max Bar & Grill," which may include the variant "macs bar & grill."

In some embodiments, the string length may be taken into account as a qualification for similar measures in order to allow for anticipatory/predictive auto-suggestion features discussed herein. In other words, the shorter length of the incomplete search string "macs b" with respect to the longer length of the index entries for "Max Bar & Grill" may be accounted for when assessing similarity. The disparity of lengths may not prevent identification of similarity. Hence, the high extent of intersection with n-grams of similar length and ordering associated with the n-grams of the first portion(s) of "Max Bar & Grill" may be identified even though the incomplete search string "macs b" may not have a high extent of intersection with subsequent portion(s) of "Max Bar & Grill." However, comparable string lengths may also be considered in assigning greater similarity scores. For example, the incomplete search string "macs b" may have high similarity with index entries for "Max Bar & Grill," but also with index entries for "Mac's Bar." In such instances, the aspect of comparable lengths of the search string and "Mac's Bar" may be recognized as indicating even greater similarity and thus the similarity score between the two may be higher than the similarity score between the search string and "Max Bar & Grill."

In some embodiments, a similar order of the intersecting sets may be taken as an additional indication of similarity. For example, a user-entered search string with "grill macs" may have a certain extent of character intersection with index entries corresponding to one business, "Max Bar & Grill," and may have a certain extent of characters section with index entries corresponding to another business, "Grill Max," however the orders of the intersecting sets may be recognized as being different with respect to these example cases. The ordering of n-grams of the search string "grill macs" has a greater correspondence to the ordering of n-grams of "Grill Max" than it does with respect to "Max Bar & Grill." Accordingly, the search string "grill macs" may be accorded a greater similarity score with respect to "Grill Max" and a lesser similarity score with respect to "Max Bar & Grill."

The above examples consider a business name, however various embodiments may employ the same methods with respect to other types of listing information. For example, category and/or keyword strings can be decomposed in similar manner. Furthermore, business names may be associated with various categories and/or keywords. For example, in some embodiments, sets corresponding to a given business may include associated categories and/or keywords. Shingles of words associated with listings, service areas, and popular queries may be stored. In some embodiments, sets corresponding to a given business may be linked to other sets of categories and/or keywords, for example, via pointers and/or other look-up tables. It should be understood that any suitable relational database approach may be used to associate the various sets and/or members thereof.

As addressed above, certain embodiments may provide a spellchecker service that is geo-sensitive. For example, for a search in the area of Monrovia, Calif., the geo-aware spellchecker 117A may recognize that an entry of "Plummer" should not be corrected to "Plumber." To facilitate the geo-sensitive spellchecking, words corresponding to listings, and variations of the words, may be stored and linked to corresponding location information. The linking may be provided by way of the one or more indexes 125, with the word variations and locations being stored in inverted index(es) in some embodiments. Accordingly, with the word variations, the indexes 125 may store corrections for misspelled search strings in order to account for spelling variations. However, not all corrections make sense for a particular area, as in the example given above. To address that reality, the indexes 125 may be configured such that the linked location information allows for spellchecking tailored to a location of interest. The geo-aware spell checker 117A may determine whether one or more corrections or an original query makes more sense in a particular area. Based on that determination, corrections which do not make sense in that area may be filtered out. Accordingly, the accuracy of spelling corrections may be improved, and false positives may be minimized.

The geo-aware spellchecker 117A may receive the search string and may identify one or more potential corrections for the search string. The geo-aware spellchecker 117A may look up the search string and the one or more potential corrections in the index(es) 125, comparing the search string and the one or more potential corrections to listing information for the identified location. If the search string is identified as a possibility for the particular location, then that may be an indication that the search string should not be corrected. If, however, the search string is not identified as a possibility for the particular location, then that may be an indication that the search string should be corrected. In some embodiments, a decision tree may be employed to check the search string first, then the most likely applicable potential correction, then the next most likely applicable potential correction, and so on until a positive indication is found in the index(es) 125. In some embodiments, the geo-aware spellchecker 117A may identify one or more potential corrections for the search string first in a geo-oblivious manner, and then analyze the potential corrections for applicability to an identified location. In some embodiments, the geo-aware spellchecker 117A may only identify a limited set of one or more potential corrections for the search string that are applicable to an identified location.

Certain embodiments may provide a clustering-based approach to facilitate the geo-sensitive spellchecking. Words corresponding to listings, and variations of the words, may be stored and linked to corresponding location information, where the location information may include location identifiers, such as latitude and longitude coordinates, for the listings. For example, business names may be stored with coordinates for the businesses. Then, clusters may be formed based on the location information. For example, when displayed on a map, businesses with a given business name (such as a chain of restaurants) may have multiple locations. Using any suitable clustering algorithm, one or more boundaries may be drawn or otherwise defined to surround one or more clusters of the businesses.

The corresponding clusters of data may be used for verification of a search string and one or more potential corrections for the search string. The geo-aware spellchecker 117A may receive the search string and may identify one or more potential corrections for the search string. The geo-aware spellchecker 117A may look up the search string and the one or more potential corrections in the clustered data, comparing the search string and the one or more potential corrections to listing information in the cluster that corresponds to the identified location. Stated otherwise, the geo-aware spellchecker 117A may check if a word and/or n-gram is found in the cluster. If the search string is identified as a possibility for the particular location, then that may be an indication that the search string should not be corrected. If, however, the search string is not identified as a possibility for the particular location, then that may be an indication that the search string should be corrected. In some embodiments, a decision tree may be employed with the cluster, as discussed above.

As addressed above, certain embodiments may provide an autosuggestion service that is geo-sensitive. The autosuggestion service may provide type-ahead suggestions that are geographically relevant. As a user types a search query, the user may be presented with the type-ahead suggestions that are relevant to user's current geography and/or another geography of interest. Though reference is made herein to type-ahead suggestions and in some embodiments one or more suggestions could appear in the query field as a type-ahead suggestion, the term type-ahead suggestion could include other manners of presentation, such as over at least a portion of the query field, or beside the query field so that a user may accept a suggestion via selection of a space key, selection of an enter key, or any other suitable manner of selection. In some embodiments, the search engine 117 may configured with the geo-aware autosuggester 117B to effect a geo-aware autosuggest search engine. In some embodiments, the search engine 117 may include the geo-aware autosuggester 117B. In some embodiments, the search engine 117 may not include, but may be configured to work in conjunction with, the geo-aware autosuggester 117B. In various embodiments, the geo-aware autosuggester 117B may be integral with or independent of the search engine 117. In various embodiments, a geo-aware autosuggester 117B could be implemented separately or without the spellchecking module 117A. In some embodiments, the geo-aware spellchecking module 117A could be configured as a geo-aware autosuggester 117B such that autosuggestion features are an extension of spellchecking features.

The geo-aware autosuggester 117B could receive a series of search string characters and perform a lookup with the reception of each character or set of multiple characters. The lookup could be performed with one or more indexes 125. In some embodiments, one or more filters 126 could be used in conjunction with the one or more indexes 125. To facilitate the geo-aware autosuggestion, words corresponding to suggestions/listings, and variations of the words in some embodiments, may be stored and linked to corresponding location information. For example, suggestions/listings corresponding sets of words and/or n-grams may be linked to location information in the indexes 125.

The autosuggestion service may provide suggestions that are relevant to a geographical area(s) of interest. The suggestions may correspond to listings that in close proximity to an area of interest, as providing suggestions that are too far away from the area of interest may negatively impact the user experience. In providing suggestions, the autosuggestion service may allow for a quick response time so that suggestions are provided between key presses of a user. By way of example, the autosuggestion service may provide suggestions on the order of milliseconds or tens of millisecond in response to each character input. Given such constraints, it may be advantageous to divide geographical areas into multiple smaller areas. A code may be assigned to each small area, and that area code may be assigned to the suggestions relevant to that area.

Accordingly, the location information may include location identifiers. Linked information may be distinguished, segregated, and/or categorized based on location in any suitable manner, with any suitable location identifiers being used to link information to corresponding areas. In various embodiments, the location could have any suitable level of specificity, e.g., including a county, a municipality, zip code, school district, business directory service area, and/or the like. For example, a zip code, a collection of zip codes, one or more listing service directory codes (which may correspond to particular telephone directory service areas, which service areas could be defined by zip code(s)), and/or the like may be used as a basis for linking information to a location.

Figure 5:
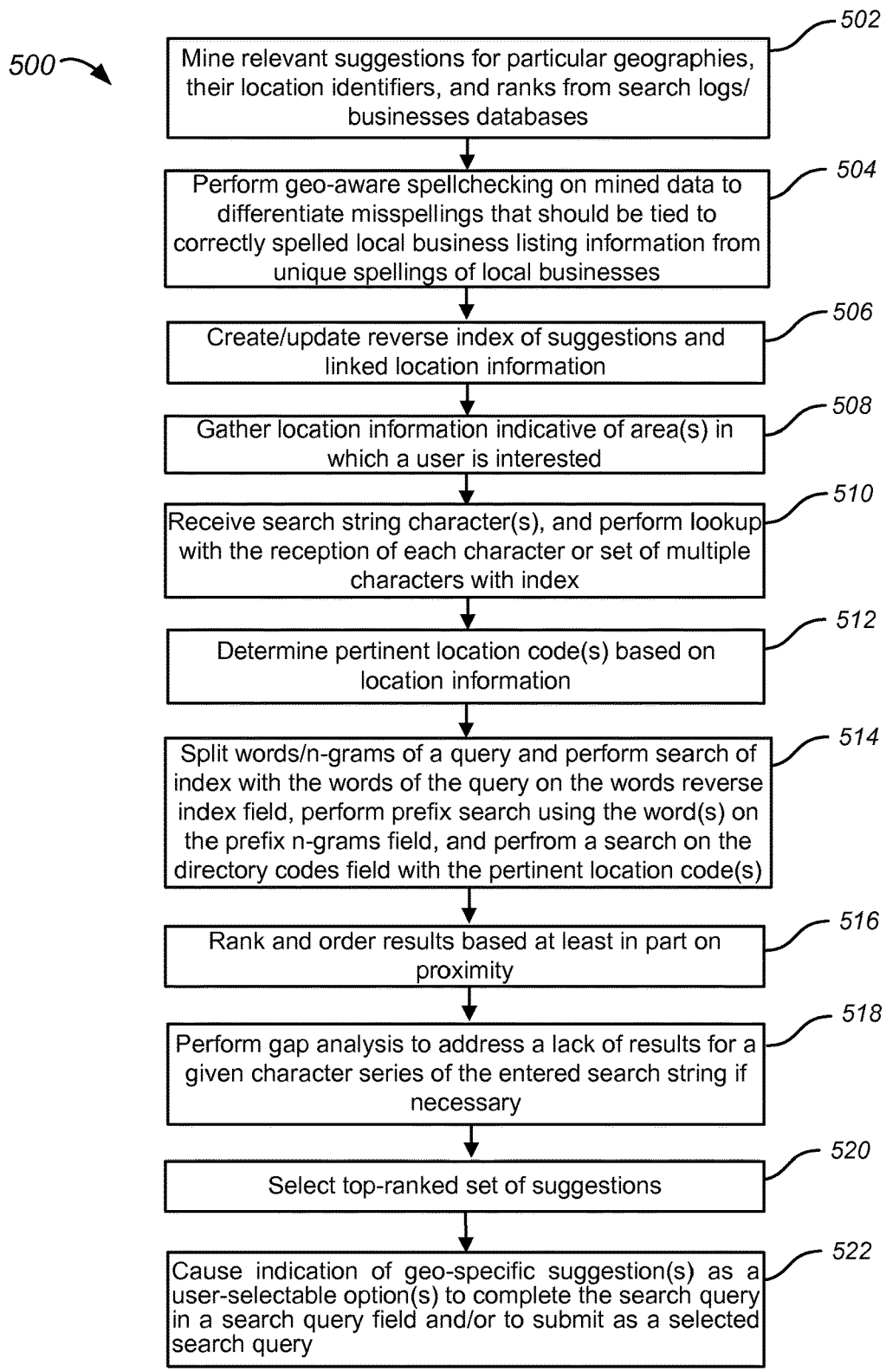
FIG. 5 illustrates an example method of providing for geo-aware auto-suggestion, in accordance with certain embodiments of the present disclosure.

FIG. 5 illustrates an example method 500 of providing for geo-aware autosuggestion, in accordance with certain embodiments of the present disclosure. According to some embodiments, the method 500 may begin as indicated by 502. Teachings of the present disclosure may be implemented in a variety of configurations that may correspond to systems described herein. As such, the order of the steps comprising the method 500 and/or the other methods disclosed herein may be shuffled in any suitable manner and may depend on the implementation chosen. Moreover, while the steps of the method 500 and/or the other methods disclosed herein may be separated for the sake of description, it should be understood that certain steps may be performed simultaneously or substantially simultaneously.

As indicated by block 502, relevant suggestions for particular geographies may be mined from search logs and businesses database(s). The search logs may include past click, selection, and/or search information indicative of user interest in businesses in the information repositories. The number of clicks, selections, and/or searches over time may be assessed for particular geographical areas and for particular businesses. Any suitable basis or bases may be used for mining and selecting geo-aware suggestions in various embodiments. For example, suggestions may be mined from one or more of listings repositories corresponding to merchant subscriber database(s), past click information, frequency of particular queries in a particular locality, trends of particular queries in a particular locality, search logs, popularity of search results corresponding to particular queries in a particular locality, reviews of particular advertisers, agreements with other advertisers to boost visibility of listings corresponding to particular queries, and/or the like. Any one or combination of such information may be bases for ranking the local businesses according to user interest. Any of various times periods may be used in various embodiments. For example without limitation, the time period for consideration could be the past year, the past 6 months, the past month, the past week, etc. To facilitate data mining, the information handling system 102 may include one or more user interest data logging and analytics modules configured to perform logging processes to receive and log user interest data. The one or more logging and analytics modules may include logic to retrieve, process, derive, compile, aggregate, handle, store, report, and/or present information relating to user interest data.

As indicated by block 504, in some embodiments, geo-aware spellchecking may be performed on mined data to differentiate misspellings that should be tied to correctly spelled local business listing information from unique spellings of local businesses. For example, in some locations, "plummer" should be corrected to "plumber," and, in some locations, "plummer" should be recognized as a correctly spelled business name, part of a business name, or other reference to a business in the local area.

As indicated by block 506, a reverse index of suggestions and linked location information may be created or updated. The linked suggestions and location information may be provided by way of the one or more indexes 125, which may include inverted/reverse index(es) in some embodiments. By way of example, an index 125 could include fields for one or more of: prefix n-grams of each word in a given suggestion; prefix n-grams of an entire suggestion; each word of a given suggestion; a location identifier(s) for each suggestion (such as a directory code(s) relevant to the business listing of the suggestion); geo coordinates corresponding to each suggestion (e.g., latitude and longitude); and/or the like.

In some embodiments, one or more of the data repositories 123 and/or indexes 125 may be updated periodically. Updating may occur at any suitable time. Updating may capture one or more of listing name changes, new business openings, business closings, query distribution changes, and/or the like. Certain embodiments may ensure or improve data integrity based on assessing frequencies for particular queries over time. Thus, the updating can be based on queries. For example, query distribution can change over time. There can be seasonal distribution changes, weekly distribution changes, and daily distribution changes. Analyzing the query distributions may identify popular changes over a particular time period, such as the last 60 or 90 days. For example, analyzing the query distributions may identify: how many queries for a particular business in a particular area; how many businesses correspond to a particular sequence of characters, particular word, and/or particular sequence of words in a particular area; and/or the like. In some embodiments, the frequency distribution can help identify and rectify spelling mistakes. Frequency distribution analysis may identify anomalies that correspond to spelling mistakes.

As indicated by block 508, the geo-aware autosuggester 117B could gather location information indicative of area(s) in which a user is interested, which is discussed further herein. As indicated by block 510, the geo-aware autosuggester 117B could receive a series of search string characters, and perform a lookup with the reception of each character or set of multiple characters with the index(es) 125. As indicated by block 512, pertinent location code(s) may be determined based on the location information. Thus, with location information indicative of area(s) of interest, the geo-aware autosuggester 117B may determine pertinent location code(s) (e.g., directory codes) based on proximity of the query's geography and perform the lookup with a prefix of a search term currently entered (i.e., any characters currently entered for the keyword(s)). As indicated by block 514, the geo-aware autosuggester 117B may be configured to split words/n-grams of a query and perform a search of the index 125 with the words of the query on the words reverse index field, do a prefix search using the word(s) on the prefix n-grams field (e.g., the last partial word entered), and do a search on the directory codes field with the pertinent location code(s). This could yield all the relevant suggestions for that query in the geography. As indicated by block 516, the results could be ranked and ordered based at least in part on proximity. The prefix n-grams of the whole suggestion field and distance calculated from the user's geography (e.g., coordinates) to the suggestion geography could be used to rank the results. The results could be ordered according to rankings.

As indicated by block 518, in some embodiments, gap analysis may be performed to address a lack of results for a given character series of the entered search string. In certain embodiments, if no local result or too few local results are found for the partially entered query, the search area and/or corresponding listing information may be iteratively modified dependent upon the results. For example, an initial search for an initial search area may yield too few or no results; and the search area may be iteratively expanded to increase the results. When sufficient results are determined, whether by an initial search or an iterative search, distance calculated from the user's geography (e.g., coordinates) to the suggestion geography could be used to rank the results. In certain embodiments, in addition or in alternative, if no local result or too few local results are found for the partially entered query, fuzzy search methods discussed herein may be employed to loosen the strictness of the searching. Fuzzy searching could, for example, be used after iteratively expanding the search area to a certain threshold (say, for example, an entire metro area corresponding to the area of interest indicated by the location information). The search string could be compared to index entries to assess similarity and to allow for approximate matching.

As indicated by block 520, a top-ranked set of suggestions may be selected. Those results corresponding to distances that are too far (e.g., results corresponding to distances beyond predetermined distance threshold(s), results that are relatively low-ranked, results that are not ranked in the top X number of results, and/or the like) may be pruned away to yield the final suggestion list. As indicated by block 522, indication of geo-specific suggestion(s) as a user-selectable option(s) to complete the search query in a search query field and/or to submit as a selected search query may be cause. Suggestion information may be sent to the end-user computing device and user-selectable options may be presented by way of the application.

Figure 6A:
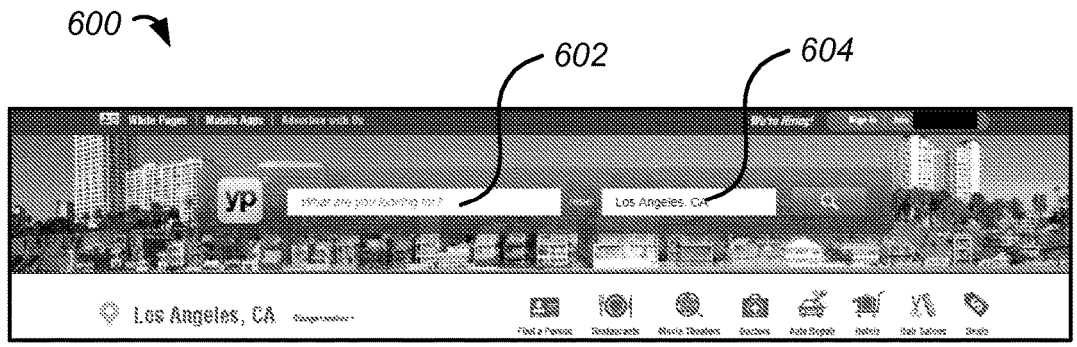
FIG. 6A illustrates a graphical user interface that may be used in implementations of certain embodiments of the present disclosure.

FIG. 6A illustrates a graphical user interface 600 that may be used in implementations of certain embodiments of the present disclosure. FIG. 6A shows a screenshot, which may be a partial screenshot, of a search interface 600 that may be displayed via a web page. The search interface 600 can be displayed at a user device 102. The search interface 600 includes a query field 602 for input of a query by a user, for example, via text entry. In some embodiments, the search interface 600 may also include a location field 604 for input of a query by a user, for example, via text entry. In some embodiments, a location may be automatically entered by the system into the location field 604 based on any suitable location identification method, such as one or more of the location identification methods disclosed herein. The fields 602, 604 may include portions of a web page that allows the user to enter textual information via a keyboard or other input device. The query field 602 may receive entry of keyword information for a search. The location field 604 may receive entry of location information to indicate a location of interest related to the keyword information for the search.

Figure 6B:
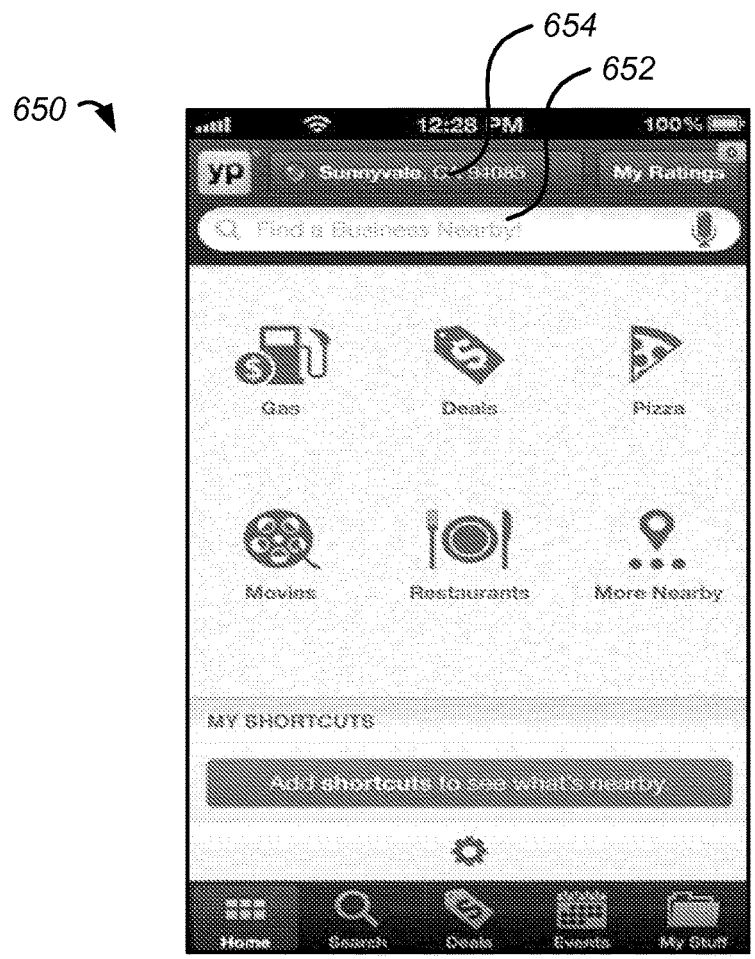
FIG. 6B illustrates another graphical user interface that may be used in implementations of certain embodiments of the present disclosure.

FIG. 6B illustrates another graphical user interface 650 that may be used in implementations of certain embodiments of the present disclosure. FIG. 6B shows a screenshot of a mobile application search interface 650 that may be shown on a user device 102 that is a mobile computing device. The search interface 650 includes a query field 652 for input of a query by a user, for example, via text entry. In some embodiments, the search interface 600 may also include a location field 654 for input of a query by a user, for example, via text entry. In some embodiments, a location may be automatically indicated by the location field 654 based on any suitable location identification method, such as one or more of the location identification methods disclosed herein. The location field 654 may allow for a user to change the automatically indicated location to a different location. The fields 602, 604 may include portions of a web page that allows the user to enter textual information via a keyboard or other input device. The query field 602 may receive entry of keyword information for a search. The location field 604 may receive entry of location information to indicate a location of interest related to the keyword information for the search.

Figure 7:
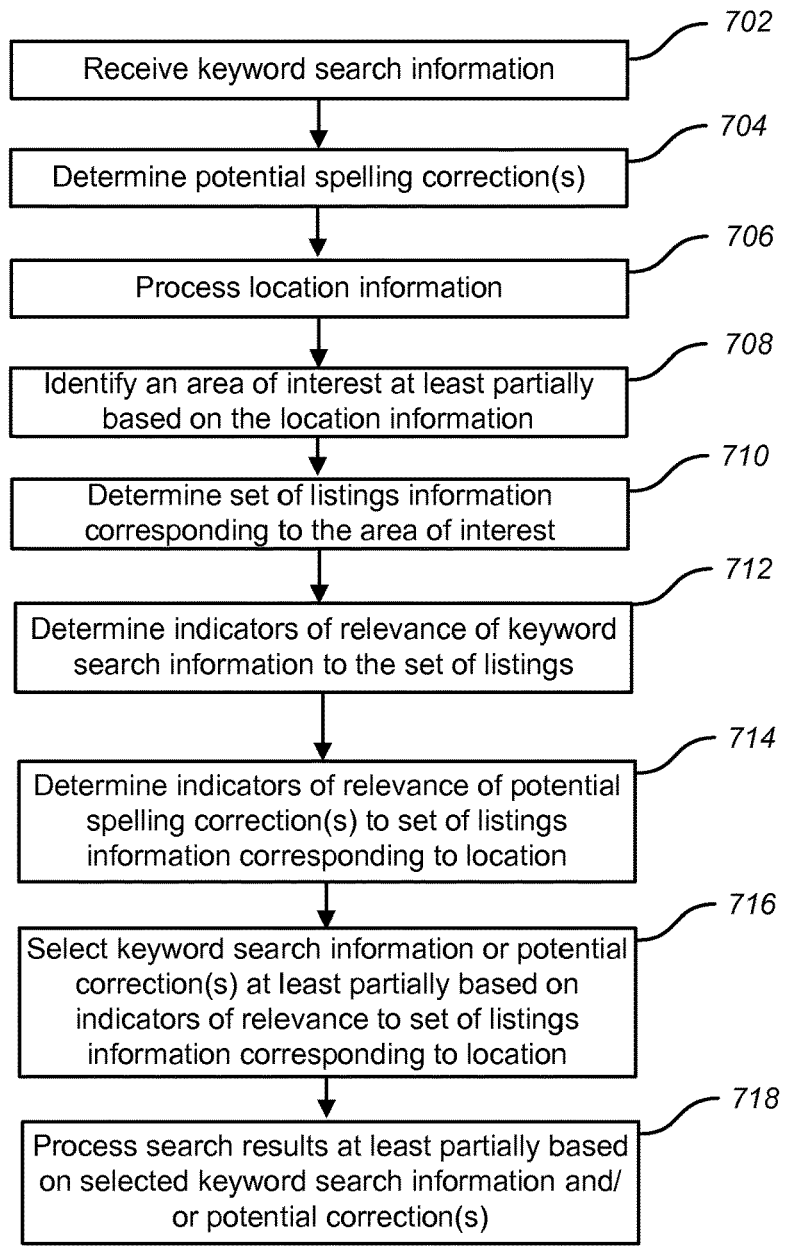
FIG. 7 illustrates an example method of providing for geo-aware spellchecking in a geographical area of interest to a user of a computing device, in accordance with certain embodiments of the present disclosure.

FIG. 7 illustrates an example method 700 of providing for geo-aware spellchecking in a geographical area of interest to a user of a computing device 102, in accordance with certain embodiments of the present disclosure. According to some embodiments, the method 700 may begin as indicated by 702. Teachings of the present disclosure may be implemented in a variety of configurations that may correspond to systems described herein. As such, the order of the steps comprising the method 700 and/or the other methods disclosed herein may be shuffled in any suitable manner and may depend on the implementation chosen. Moreover, while the steps of the method 700 and/or the other methods disclosed herein may be separated for the sake of description, it should be understood that certain steps may be performed simultaneously or substantially simultaneously.

Though not depicted in FIG. 7, in some embodiments of the method 700 and/or other methods disclosed herein, a mobile application 151, which is configured to run on a computing device 102, may be provided. The mobile application 151 may be provided in any suitable way. For non-limiting example, the mobile application 151 may be made available from the information handling system 106 or any website for download to the computing device 102; alternatively, it may be pre-installed on the mobile computing device. The mobile application 151 may be stored in the memory 134 and/or computer-readable media 146.

As indicated by block 702, keyword search information may be received. A user may input a query into a query field provided with the computing device 102. Information corresponding to the input may be transferred to and received by the information handling system 106. In response to user selection of a search option, the user device 102 communicates the keyword information to the information handling system 106. In some embodiments, the user device 102 may communicate location information, as well. In response, the system 106 may perform a search as described herein. However, the method 700 could allow for user identification of search criteria at any one or more of various suitable points in the process flow, according to various embodiments. By way of example without limitation, the user may identify search criteria prior to, contemporaneous with, and/or after location information is processed.

In some embodiments, the keyword search string may be processed character by character as the search string is typed, or by character group as the search string is typed. The search string may include any suitable number of characters and may correspond to an incomplete or a complete keyword(s). Accordingly, partial keyword search information may be processed as the user types a search string. In some embodiments, character-by-character transmission to the information handling system 106 is automatically performed prior to subsequent character input by the user and/or the user selection of the search option.

As indicated by block 704, one or more potential spelling corrections may be determined. In some embodiments, the spellchecker 117A may receive a search string corresponding to the user input into the query field and may use the indexes 125 to identify one or more potential corrections for the search string. In some embodiments, the spellchecker 117A may decompose the search string at the word level and search the indexes 125 for one or more sets with one or more words in common with the search string. In some embodiments, the spellchecker 117A may decompose the search string into n-grams of any suitable length and search the indexes 125 for one or more sets with one or more n-grams in common with the search string. In some embodiments, the search string may be analyzed at least in part by identifying one or more corresponding prefixes. For example, a prefix of the search string may be identified for comparison, and one or more corresponding prefixes in the listing prefixes repository 120' may be identified based on the prefix of the search string as discussed herein.

As indicated by block 706, location information may be processed. The information may be processed at, by, and/or with the computing device 102 and/or the information handling system 106. In some embodiments, the location engine 116 may process information about a first location. The information may be automatically gathered and may correspond to the location of the computing device 102. In some embodiments, the computing device 102 automatically determines its current position (e.g., via a satellite positioning system, or a cellular positioning system) and transmits the determined or estimated position to the location engine 116. The computing device 102 could provide the position in response to a request from the location engine 116. The processing of location information could be performed prior to and/or during the entry of keyword search information in some embodiments.

For example, in the case of a cellular number, the user device may be a wireless mobile device, and the location of the wireless mobile device can be determined using a number of ways. For example, the computing device 102 may include one or more GPS receivers 138, one or more accelerometers, one or more magnetometers, and/or one or more gyroscopes that enable determination of its position based on data provided by these components and/or signals received by these components, such as received satellite signals. In certain embodiments, triangulation methods (e.g., triangulation based on cellular towers, Wi-Fi-based location, carrier-provided location, or any suitable cloud-based location method, service, source, and/or technique) may be employed to identify the location of the computing device.

In the case of GPS, the GPS receiver 138 may facilitate the identification of GPS coordinates.

In some embodiments, the cellular site in which the mobile device can communicate to a based station can be used to determine a rough position of the cellular phone. In general any method used by a cellular phone provider to get location information (e.g., for emergency service) can be used. An access point for a wireless local area network or a wireless personal area network typically has a small coverage area. Based on the location of the access point, location information (e.g., the city, or more precise location information) can be obtained. Location information may be obtained from a cellular location server, in some embodiments. The location may be based at least in part on and/or determined at the mobile station or determined at a server station. In some embodiments, a third party data source 108, such as a cellular advertiser, may provide indication of a location from which the call originates.

In some embodiments, the location of the mobile device may be determined via a satellite positioning system or a pseudolite positioning system. The location of the mobile device may be determined automatically through a Global Positioning System (GPS) receiver that is connected to, or built within, the mobile device. Pseudolites are ground-based transmitters of signals similar to a GPS. Pseudolites are useful in situations where signals from an orbiting satellite might be unavailable, such as tunnels, mines, buildings or other enclosed areas. A satellite/pseudolite signal receiver may determine its location and transmit the location through the cellular phone to a cellular communication system, or transmit the received signals to a location server which computes the location.

In some embodiments, an IP address of computing device, for example, a mobile computing device, such as a tablet, may be a basis for location information. In the case that the user device is accessing the Internet through an internet service provider, location information for the user device can be obtained automatically from the internet service provider.

In addition or in the alternative to automatically-gathered location information, a user may enter location information with the computing device 102, e.g., with the location field. The user may identify any location interest by entering location information into the mobile computing device. The user may enter an address, a partial address, a city, a zip code, a location keyword, or any suitable location-indicating information. As noted previously, the user may enter location information corresponding to a place of work, the user's home, or other locations of interest.

In some embodiments, location information can be obtained from user preference data. In some embodiments, when the user searches for information without explicitly specifying a geographic area, the geographic area of interest can be determined based on typical geographic radius of interest on the topic and the location of the user. Thus, the location information can be inferred from the search information.

As indicated by block 708, an area of interest may be identified at least partially based on the location information. In some embodiments, the area of interest can be determined prior to and/or during the entry of keyword search information. In some embodiments, the area of interest can be determined based on a geographic radius of interest. The area of interest can correspond to, for example, a zip code, a collection of zip codes, and/or one or more service areas. As discussed further herein, some embodiments may take into account the specific needs of the user (e.g., if the user is traveling) and/or specific aspects of the area (e.g., travel routes, high-crime areas, etc.) when tailoring the form of an area of interest. As indicated by block 710, a set of listings information corresponding to the area of interest may be determined. As discussed herein, the set of listings information could be determined at least in part by searching location identifiers, such as directory codes, in the index 125.

As indicated by block 712, one or more indications of relevance of the keyword search information may be determined. The indications may bear on how relevant the keyword search information is to the set of listings information. As indicated by block 714, one or more indications of relevance of the potential spelling correction(s) may be determined. The indications may bear on how relevant the potential spelling correction(s) are to the set of listings information. For example, the spellchecker 117A may look up the keyword search string and the one or more potential corrections in the index(es) 125. The spellchecker 117A may compare the search string and the one or more potential corrections to the set of listings information. If the search string is identified as a possibility for the particular location, then that may be an indication that the search string should not be corrected. If, however, the search string is not identified as a possibility for the particular location, then that may be an indication that the search string should be corrected.

As indicated by block 716, the original keyword search string and/or the potential correction(s) may be selected at least partially based on indicators of relevance to set of listings information corresponding to location. In some embodiments, a decision tree may be employed to check the search string first, then the most likely applicable potential correction, then the next most likely applicable potential correction, and so on until a positive indication is found in the index(es) 125. In some embodiments, the first positive indication, whether it be the search string or a potential correction, found is used.

In some embodiments, the significance of the keyword search string and the one or more potential corrections to the set of listings information may be determined and assigned weights accordingly. In some embodiments, a TF/IDF may indicate a weight for significance measures. Thus, in some instances, even though the search string is identified as a possibility for the particular location, the significance of the search string to the set of listings may be lower than the significance of a potential correction. In such cases, the potential correction may be used in addition or in alternative to the search string in some embodiments. In some embodiments, the potential correction may be used only if a differential threshold as between the two significance measures is met. Any suitable threshold may be employed.

In some embodiments, the potential correction and the search string may be used in instances where the differential in significance measures is within a first range or distance and/or if a first differential threshold is met. Any suitable number of thresholds may be implemented in some embodiments. The multiple thresholds may correspond to various weights. In some embodiments, only the potential correction may be used in instances where a second differential threshold is met, indicating the significance measure of the potential correction is significantly higher than the significance of the search string.

In some embodiments, an indication of whether or not the search string should be corrected may be based on past click, selection, and/or search information. For example, past click, selection, and/or search data for the original keyword search string and potential corrections could be mined from click, selection, and/or search logs. The number of clicks, selections, and/or searches over time may be assessed for each of the keyword search string and potential corrections.

Any of various times periods may be used in various embodiments. For example without limitation, the time period for consideration could be the past year, the past 7 months, the past month, the past week, etc. Any suitable threshold may also be employed in conjunction with the past click, selection, and/or search information. For example, a minimum threshold of X number of clicks, selections, and/or search per Y time period may be imposed. Even if a potential correction is found in a set of listings for a particular location, the past data for the potential correction may be required to the meet the threshold. Any suitable number of thresholds may be implemented in some embodiments. The multiple thresholds may correspond to various weights. The weights could contribute to scoring the original keyword search string and potential corrections. The original keyword search string and the potential corrections could be ranked, and the one with the greatest score may be selected. In some embodiments, the original keyword search string and the potential correction(s) could be selected for searching as indicated by block 718, search results may be processed at least partially based on the selected keyword search information and/or the potential correction(s).

In some embodiments, keyword search information may be processed character-by-character, and any one or combination of the method steps may be performed as the search string is being input into the query field. In some embodiments, search results may be pre-loaded as the search string is being input into the query field. As each character is input into the query field, subsets of the documents may be identified, and documents may be stored in cache for faster retrieval. The documents identified for pre-loading may correspond to one or more of the original search string and/or the one or more potential corrections. In various embodiments, various method steps may be performed on the basis of any number of characters as the characters are input into the query field.

Certain embodiments may employ any suitable compression method. For example, in some embodiments, information for a particular business, such as a business name, may need only be stored once for a particular area. A concomitant frequency field may indicate the number of sites for that particular business in that particular area.

Figure 8:
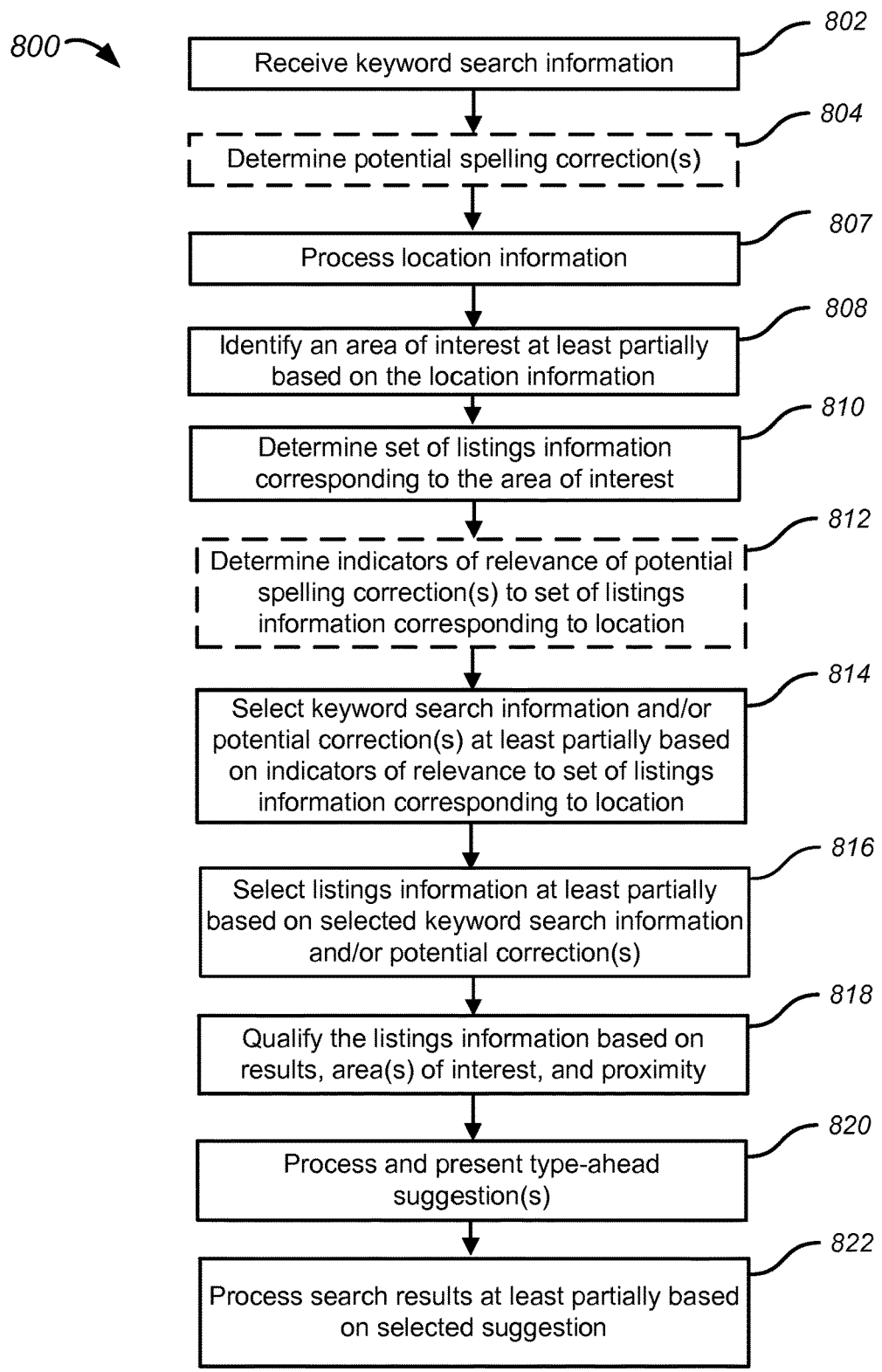
FIG. 8 illustrates an example method of providing for geo-aware search features corresponding to a geographical area of interest to a user of a computing device, in accordance with certain embodiments of the present disclosure.

FIG. 8 illustrates an example method 800 of providing for geo-aware search features corresponding to a geographical area of interest to a user of a computing device 102, in accordance with certain embodiments of the present disclosure. In some embodiments, geo-aware spellchecking features may be implemented in conjunction with autosuggestion features. According to some embodiments, the method 800 may begin as indicated by 802.

As indicated by block 802, keyword search information may be received as discussed herein. And as discussed herein, in some embodiments, the keyword search string may be processed character by character as the search string is typed, or by character group as the search string is typed. Character-by-character processing may allow for type-ahead suggestions and/or suggestions that are otherwise presented to the end user prior to subsequent character input by the user and/or user selection of the search query submission option.

As indicated by block 804, in some embodiments, one or more potential spelling corrections may be determined in one or more various ways in accordance with various embodiments discussed herein. As indicated by block 806, location information may be processed in one or more various ways in accordance with various embodiments discussed herein. As indicated by block 808, an area of interest may be identified at least partially based on the location information in one or more various ways in accordance with various embodiments discussed herein.

As indicated by block 810, a set of listings information corresponding to the area of interest may be determined. The set of listings information may include location-specific suggestions. As discussed herein, a location-specific set of suggested listing information could be determined at least in part by searching location identifiers, such as directory codes, in the index 125. In some embodiments, such a lookup could generally identify suggestions relevant to the area of interest.

As indicated by block 812, in some embodiments where geo-aware spellchecking is employed in conjunction with auto-suggestion features, one or more indications of relevance of the potential spelling correction(s) may be determined, as discussed herein. As indicated by block 814, in some embodiments where geo-aware spellchecking is employed in conjunction with auto-suggestion features, either the original keyword search string and/or the potential correction(s) may be selected at least partially based on indicators of relevance to set of listings information corresponding to location. In some embodiments, a decision tree may be employed to check the search string first, then the most likely applicable potential correction, then the next most likely applicable potential correction, and so on until a positive indication is found in the index(es) 125.

In some embodiments, the significance of the keyword search string and the one or more potential corrections to the set of listings information may be determined and assigned weights accordingly. In some embodiments, a TF/IDF may indicate a weight for significance measures. Thus, in some instances, even though the search string is identified as a possibility for the particular location, the significance of the search string to the set of listings may be lower than the significance of a potential correction. In such cases, the potential correction may be used in addition or in alternative to the search string in some embodiments. In some embodiments, the potential correction may be used only if a differential threshold as between the two significance measures is met. Any suitable threshold may also be employed.

In some embodiments, the potential correction and the search string may be used in instances where the differential in significance measures is within a first range or distance and/or if a first differential threshold is met. Any suitable number of thresholds may be implemented in some embodiments. The multiple thresholds may correspond to various weights. In some embodiments, only the potential correction may be used in instances where a second differential threshold is met, indicating the significance measure of the potential correction is significantly higher than the significance of the search string.

As indicated by block 816, listings information may be processed at least partially based on the selected keyword search information and/or the potential correction(s). For example, a subset of the set of listing information may be selected using the selected keyword search information and/or the potential correction(s) as criteria. In some embodiments, where the listings information is or includes suggestion information, the suggestion information may be processed at least partially based on the selected keyword search information and/or the potential correction(s).

As indicated by block 818, in some embodiments, the listings information may be qualified based at least in part on one or more of results, area(s) of interest, and/or proximity. The qualification may bear on how relevant the listings information is to the area(s) of interest. In certain embodiments, the search area and/or corresponding listing information may be iteratively modified dependent upon the results of one or more searches. For example, an initial search for an initial search area may yield too few or no results; and the search area may be iteratively expanded to increase the results. When sufficient results are determined, whether by an initial search or an iterative search, distance calculated from the user's geography (e.g., coordinates) to the suggestion geography could be used to rank the results.

In some embodiments, as indicated by block 820, suggestions may be processed. For example, suggestions from the index(es) 125 may be selected based on rankings discussed herein. Selected suggestions may be presented for user selection in, proximate, or otherwise in a manner associated with the query field based on the selected keyword search information and/or the potential correction(s). For example, a top-ranked suggestion could appear in the query field as a type-ahead suggestion, over at least a portion of the query filed, or beside the query field so that a user may accept the top-ranked suggestion via selection of a space key, selection of an enter key, or any other suitable manner of selection. Additional suggestions could appear beside the query field (e.g., in a drop-down listing) for user selection in any suitable manner. The additional suggestions could be presented in a ranked order according to their suggestion ranking, which, as discussed herein, may be based on mined user interest data.

And, as indicated by block 822, the search may be performed, and search results may be processed at least partially based on the selected suggestion. In some embodiments where keyword search information may be processed character by character (or character group by character group), any one or combination of the method steps may be performed as the search string is being input into the query field. In some embodiments, search results may be preloaded as the search string is being input into the query field. The search results may correspond to the one or more suggestions. As each character is input into the query field subsets of the listing information may be identified and may be stored in cache for faster retrieval. The listing information identified for pre-loading may correspond to one or more of the original search string, the one or more potential corrections, and/or the one or more suggestions. In various embodiments, various method steps may be performed on the basis of any number of characters as the characters are input into the query field.

Certain embodiments may employ any suitable compression method. For example, in some embodiments, information for a particular business, such as a business name, may need only be stored once for a particular area. A concomitant frequency field may indicate the number of sites for that particular business in that particular area.

Figure 9:
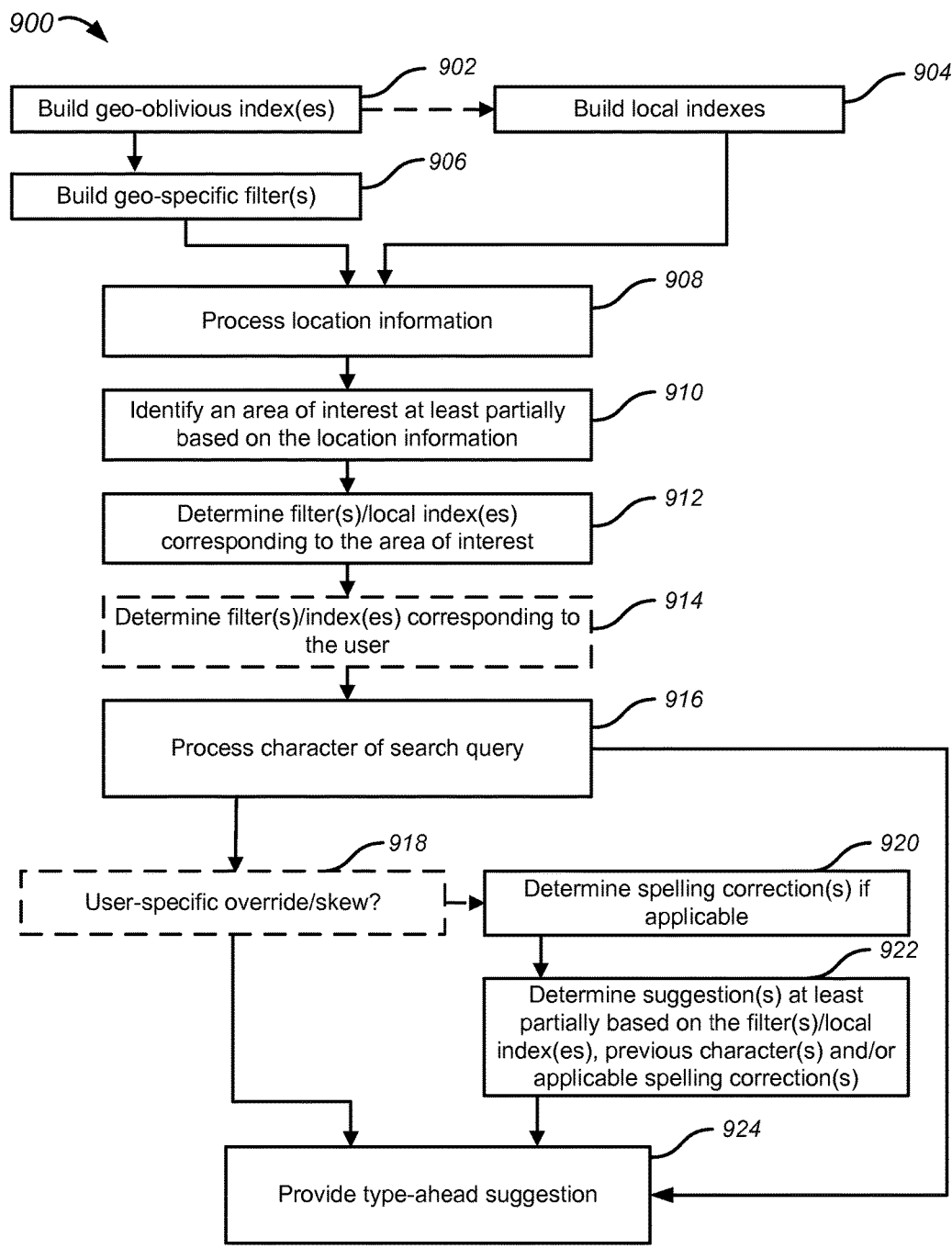
FIG. 9 illustrates an example method of providing for geo-aware autosuggestion in a geographical area of interest to a user of a computing device 102, in accordance with certain embodiments of the present disclosure.

FIG. 9 illustrates an example method 900 of providing for geo-aware autosuggestion in a geographical area of interest to a user of a computing device 102, in accordance with certain embodiments of the present disclosure. According to some embodiments, the method 900 may begin as indicated by 902. As indicated by block 902, one or more geo-oblivious indexes may be constructed. The one or more geo-oblivious indexes may correspond to a master index of embodiments.

As indicated by block 904, in some embodiments, local indexes may be constructed. As previously disclosed, one or more indexes 125 may be constructed and linked to particular localities. Strings corresponding to listing information may be decomposed, and an inverted list may be generated for each n-gram. Corresponding strings may be determined and linked, which corresponding strings may include one or more of similar strings, synonymous strings, spelling variants (which may include phonetic variants, punctuation variants, symbol variants, spacing variants, capitalization variants, and/or the like), and/or the like. TF/IDF may be determined. Suggestions for a locality may be ranked and sorted according to alphabetical order based on character(s). For example without limitation, a top-ranked suggestion or set of suggestions for the locality may be identified for a single character input C1, and top-ranked suggestions for the locality may be identified for character strings stemming from the first character input C1 (C1C1, C1C2, C1C3, . . . C1C1C1, C1C1C2, . . . etc.) so that, as a user types a query character by character, corresponding geo-aware suggestions may be selected character by character. The most relevant suggestion(s) for each prefix or other character string input may be identified and, in the case of multiple suggestions for a given input, sorted according to relevancy. Accordingly, a small number of the most relevant suggestion(s) corresponding a user input may be identified for presentation to a user, which small number may be compatible with limited presentation space and maximum ease for user skimming (i.e., a user may not be interested in reviewing a long list of decreasingly relevant suggestions).

As discussed herein, any suitable basis or bases may be used for scoring and ranking geo-aware suggestions in various embodiments, including one or more of past click information, frequency of particular queries in a particular locality, trends of particular queries in a particular locality, popularity of search results corresponding to particular queries in a particular locality, agreements with other advertisers to boost visibility of listings corresponding to particular queries, relevance/correspondence of query strings to listings, and/or the like. Some embodiments may assess relevance of a suggestion in accordance with one or more aspects of assigning weights and an overall relevance score as discussed herein with respect to method 1200, for example. Some embodiments may qualify a suggestion according to a graduated scoring scale. Any suitable suggestion scoring scale may be used in various embodiments. Some embodiments may score a suggestion with a numerical expression. A suggestion scoring scale could include a range of suggestion scores from 0 to 100, with the higher end corresponding to higher percentiles of user interest indicia. Some embodiments may use methods of statistical analysis to derive a suggestion score.

In some embodiments, geo-aware spellchecking features discussed herein may be applied to the geo-aware suggestions in order to capture variants and to handle unusual character combinations. Thus, with variants and/or unusual character combinations, variants may be selected automatically, and, in some embodiments, options may be presented to the user (e.g., "Did you mean <insert variant>?" or "How about <insert variant>"?) that may be particularly appropriate if the variance of the suggestion is significantly different, such as having a different starting character(s).

As indicated by block 906, in some embodiments, alternatively or additionally, one or more geo-specific filters may be constructed in addition to or in alternative to building local indexes. The one or more geo-specific filters may be used to refine the master index to select a geo-specific subset of index components in a manner similar to the construction of local indexes, without actually creating local indexes. For example, in some embodiments, a geo-specific filter may employ a pointer method to only identify those index components of the master index that are geo-relevant. As another example, in some embodiments, a geo-specific filter may deselect, hide, or otherwise indicate certain index components of the master index as not being geo-relevant. Certain columns and/or rows of tabulated index data, for example, could be hidden. Any suitable method may be employed to refine the master index and or otherwise create a temporary or permanent custom index with one or more geo-specific filters. Thus, the one or more geo-specific filters may function as an overlay for the master index.

As indicated a block 908, location information may be processed in one or more ways in accordance with various embodiments discussed herein. As indicated by block 910, an area of interest may be identified at least partially based on the location information, as discussed herein. As indicated by block 912, one or more geo-specific filters and/or local indexes corresponding to the area of interest may be determined.

As indicated by block 914, in some embodiments, one or more filters and/or indexes corresponding to the user may be determined. In some embodiments, the mobile application and/or the information handling system may include features for automatically identifying potential queries and/or listings of interest to a specific user based at least in part on user history information. A particular user could have a history and/or profile associated with using search features facilitated by the information handling system, for example, via a client application, a webpage, a mobile application, and/or the like. For example, queries and/or listings of interest may be identified from query and/or web browsing history information retained on the user computing device. Some embodiments may provide for options for user initiation of gathering indicia from user history information; some embodiments may perform the process automatically. Some embodiments may skew suggestions in view of user history by creating a user-specific filter. For example, a user history may indicate the level of interest in certain types of listings, say restaurants, types of restaurants, and suggestions may be accordingly skewed in view of that interest. As another example, a user is to indicate a level of interest corresponding to a particular location, and suggestions likewise may be accordingly skewed in view of that interest.

As indicated a block 916, one or more characters of the search query may be processed. In some embodiments, character-by-character transmission the information handling system 106 is automatically performed prior to the user selection of the search option. In some embodiments, suggestion information may be available locally on the device of the user such that character-by-character transmission is minimized or not necessary.

As indicated by block 918, in some embodiments, a user-specific override and/or skew may be employed. It may be determined whether such user-specific qualifications are to be employed in a given implementation. In the case that it is determined that such user-specific qualifications are to be employed, user-specific suggestions could be provided in lieu suggestions that would otherwise be selected. For example, previous queries of a specific user could supplant suggestions that would otherwise be provided. Additionally or alternatively, previous queries of a specific user could be used to rank suggestions differently. For example, a user's level of interest in a particular type of listing may be used to score listings differently; say the user has had a previous interest in pizza restaurants, suggestions of pizza restaurants could be weighted more heavily in view of that interest.

Figure 10:
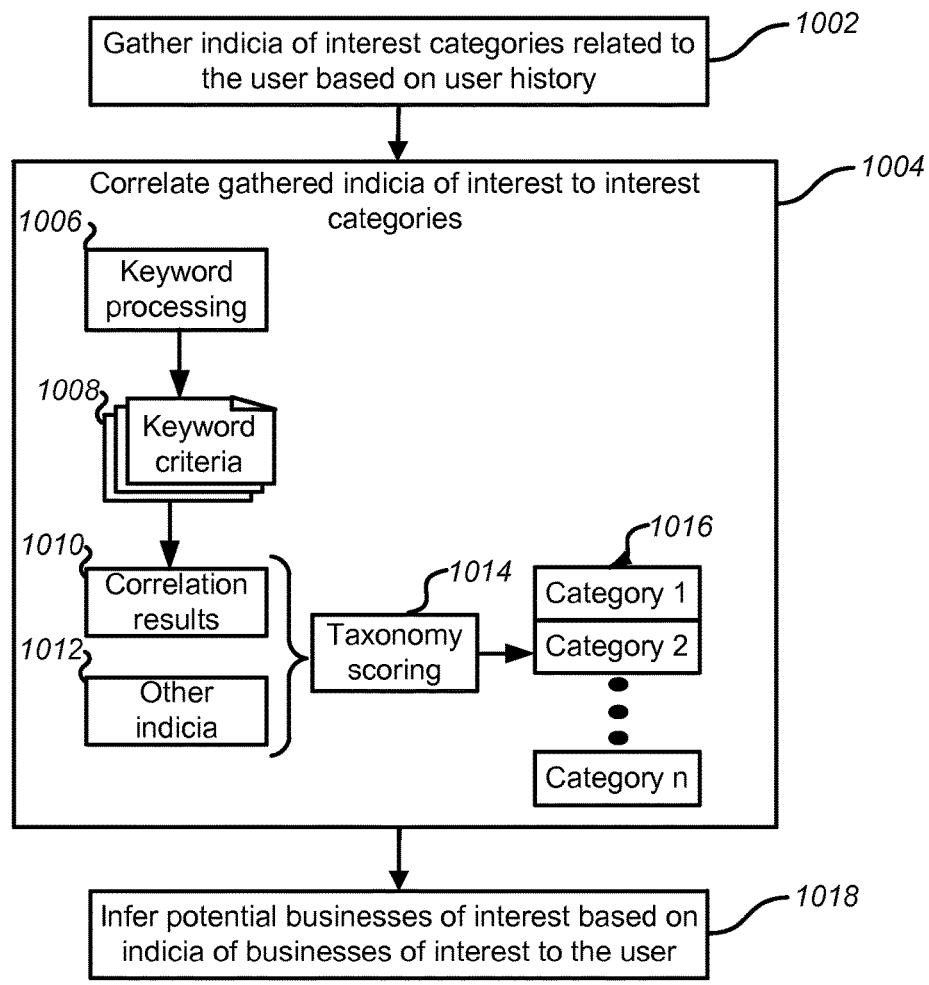
FIG. 10 is a block diagram that illustrates an example method of gathering indicia of user interests, in accordance with certain embodiments of the present disclosure.

FIG. 10 is a block diagram that illustrates an example method 1000 of gathering indicia of user interests, in accordance with certain embodiments of the present disclosure. The method 1000 may illustrate certain aspects as a predicate to user-specific adaptation in various embodiments such as, for example, the user-specific override and/or skew of method 900. As indicated by block 1002, indicia of user interests may be gathered. Interest data may include any suitable information that may be captured to indicate, infer, and/or determine interest categories and/or businesses of interest. Certain embodiments may use a client application installed on the user's computing device to facilitate data capture. In some embodiments, the client application may qualify captured data in part or in whole and/or send captured data to the information handling system 106 for qualification. In some embodiments, an interest indicia gathering utility may include features for identifying potential businesses of interest to a specific user based at least in part on user history information. A particular user could have a history and/or profile associated with using search features facilitated by the system 106, for example, via a client application, a webpage, a mobile application, and/or the like. For example, businesses of potential interest may be identified from web browsing history information retained on the user computing device.

Some embodiments may identify businesses of potential interest based on user indications of preference (such as positive rating business, an indication of liking the business, friending or otherwise linking to a business, sharing business information with others, etc.) that the user has made via webpages and/or social media. Such indications of reference may be garnered from information associated with application on the user's computing device and/or via other data sources 108. The interest indicia gathering utility may include features for automatically identifying potential businesses of interest to a specific user based at least in part on one or more other accounts of the user. A user's account with the searching service could be linked (e.g., via API) to one or more other accounts of the user, including an account associated with online social/business networking services (which may include microblogging/short messaging services), an email account, and/or any other suitable data source 108. In some cases, a user could be prompted to login to the user's other account(s) to allow for the harvesting. In some cases, previously provided authentication information stored by the system 106 may be used so that logging in is not necessary to enable the harvest. Businesses of interest could be identified by approval/disapproval indicators, which may be in form of likes, dislikes, thumbs-up, thumbs-down, star-scale ratings, number-scale ratings, fan indications, affinity group association, messages to businesses, and/or the like. The approval/disapproval indicators could be those associated with the user's profile and/or profiles of friends/associates/connections of the user.

In some embodiments, the gathering of indicia of interest may support the generation of user profiles, and could be used to refine user profiles. In some embodiments, user profiles may be transferred from the application to the information handling system 106. In other embodiments, only information related to the profiles may be transferred to the backend system 106. The information handling system 106 may have profiles for businesses. As indicated by block 1004, the gathered indicia of interest may be correlated to interest categories and/or specific suggestions. In some embodiments, the business profiles may include or be linked to one or more taxonomies that map particular businesses/ business categories and particular interests/interest categories.

Having interest data, the information handling system 106 and/or the application may implement a qualification process. Some embodiments may qualify an interest according to a graduated scale. Any suitable scale may be used in various embodiments. In some embodiments, a scale could entail a categorization scheme 1016, with any suitable categories. In some embodiments, a taxonomy scoring system 1014 could be correlated to the category scheme, such that certain scores may correspond to certain categories so that, based on a given set of interest data, a high correlation score to a particular category may indicate the category is more appropriate. Some embodiments may score with a numerical expression. Accordingly, a taxonomy score may indicate which categories are more/most likely to be appropriate for a user, thus providing a quantitative estimate of a user interest. By way of example without limitation, a scale could include a range of scores from 0 to 100, or from 0 to 1,000, with the high end of the scale indicating greater probability. Some embodiments may use methods of statistical analysis to derive a score. Various embodiments may determine a score based on any one or more suitable quantifiers.

Some embodiments may employ a decision tree, checklist, workflow, and/or the like to capture various aspects of interest data and assess those aspects to infer interest qualification. Such a decision tree, checklist, and/or workflow may incorporate any one or combination of the depicted aspects and/or similar aspects in any desired order, according to various embodiments. Interest data can be consolidated and processed to yield a taxonomy score 1014.

Certain embodiments may provide for keyword processing 1006 of gathered interest data, such as any data related to indicia of interest discussed herein. In some embodiments, an impression engine, which could be included in the autosuggestion engine in some embodiments, could perform keyword identification. The impression engine could be configured to recognize evidence of interest potential. Taxonomy scores 1014 may be based at least in part on keywords gathered. The impression engine may identify keywords as distinctive markings and could compile the keywords for the purposes of characterization from the perspective of interest potential. The keywords could be correlated with keyword criteria 1008 to characterize the data from the perspective of interest potential and to generate correlation results 1010 that can be taken into account with scoring 1014. In some embodiments, the correlation results 1010 can be taken into account in conjunction with other indicia 1012, which could correspond to any one or combination of the other indicia of interest potential discussed herein such as location information and/or the like.

In some embodiments, information harvested regarding a user may be used to infer potential businesses of interest to the user, as indicated by block 1018. For example, if interest data indicates that a user has a pet, local businesses related to pets and/or that otherwise would only be of interest if one has a pet could be identified/suggested as potential businesses of interest. Similarly, if interest data indicates that a user is a parent, businesses that would only be of interest to parents could be identified/suggested as potential businesses of interest. Accordingly, in some embodiments, user-specific override/skew may be used to modify the one or more geo-specific filters and/or local indexes.

Referring again to FIG. 9, as indicated by block 920, applicable spelling correction(s) may be determined in accordance with any one or combination of embodiments discussed herein. As indicated by block 922, one or more geo-aware suggestions may be determined at least partially based on the one or more filters and/or local indexes and previous character(s) that the user has typed search query, if any. In some cases, the one or more geo-aware suggestions may be determined at least partially based on applicable spelling correction(s). In embodiments where one or more local indexes are employed, a lookup in the one or more local indexes may be performed with the current state of the search string.

In embodiments using one or more geo-oblivious indexes that correspond to a master index, a lookup in the one or more geo-oblivious indexes may be performed with the current state of the search string. Then, the results of the lookup may be screened with the one or more geo-specific filters. Alternatively, the one or more geo-specific filters may be used to refine the master index to select a geo-specific subset of index components. For example, in some embodiments, a geo-specific filter may employ a pointer method to only identify those index components of the master index that are geo-relevant. As another example, in some embodiments, a geo-specific filter may deselect, hide, or otherwise indicate certain index components of the master index as not being geo-relevant. Any suitable method may be employed to refine the master index and or otherwise create a temporary or permanent custom index with one or more geo-specific filters. Thus, the one or more geo-specific filters may function as an overlay for the master index. Then, with the geo-specific filter(s) applied to the master index, a lookup with the current state of the search string and the refined geo-specific subset of index components may be performed. As indicated by block 924, the one or more geo-aware suggestions may be may be processed and presented as type-ahead suggestion(s) for user selection in, proximate, or otherwise in a manner associated with the query field.

Figure 11:
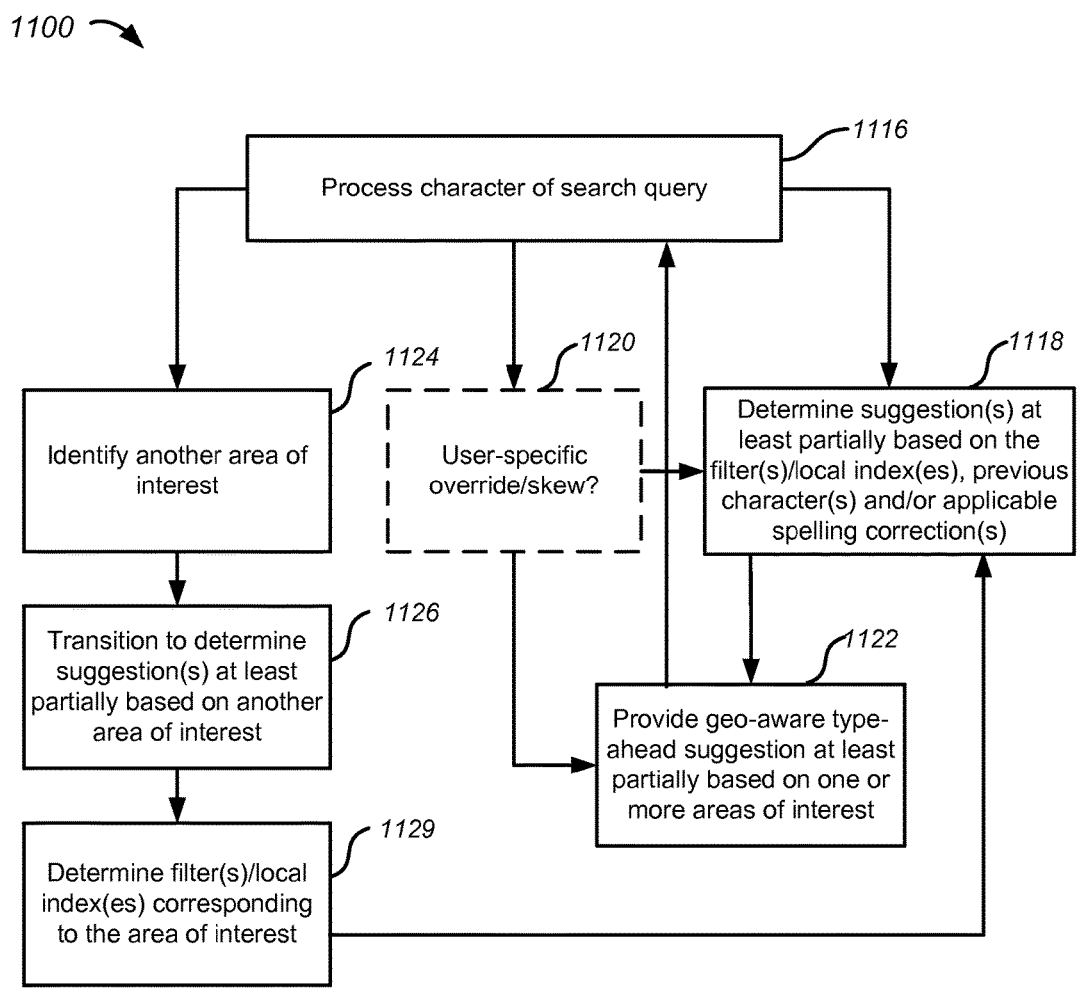
FIG. 11 illustrates an example method directed to further features for geo-aware autosuggestion in a geographical area of interest to a user of a computing device, in accordance with certain embodiments of the present disclosure.

FIG. 11 illustrates an example method 1100 directed to further features for geo-aware autosuggestion in a geographical area of interest to a user of a computing device 102, in accordance with certain embodiments of the present disclosure. The method could correspond to a subprocess of method 900 in some embodiments, with step 1116 of method 1100 corresponding to step 916 of method 900. The method 1100 may allow for type-ahead geo-aware suggestions to transition midstream as a query is entered character by character from a first area(s) of interest to a second area (s) of interest based at least in part on real-time determination that the second area(s) of interest are relevant.

As indicated a block 1116, one or more characters of the search query may be processed. As indicated by blocks 1118, 1120, and 1122, the process may proceed as previously discussed with respect to a first set of one or more areas of interest. However, as indicated by block 1124, a second set of one or more areas of interest may be identified as the process proceeds. For example, while a first set of location information may have been previously processed, a second set of location information may be subsequently processed. The second set of location information may be subsequently processed in any suitable manner as discussed previously. In some embodiments, the first set of location information may have been identified by default, for example, based on a past user interaction, and the second set of location information may be based on updated information. In some embodiments, the second set of location information may be due to a change in locations as the user is traveling. Say, for example, the user begins a query while in one location, gets interrupted, and then completes the query in another location. In some embodiments, the second set of location information may be derived from the search query itself. For example, the suggestion engine may check the progressing query string for location relevance. The user may enter location information as a search query and/or the search query may be relevant to one or more particular locations. For example, the search query may form a location-indicative keyword, either explicitly or implicitly.

As indicated by block 1126, the process may transition to determine one or more geo-aware suggestions at least partially based on the second set of one or more areas of interest that have been identified. In some cases, the suggestion engine may eliminate a previously identified area of interest in view of the new information. For example, a previously identified area may have been based on automatically-gathered location information about the user's whereabouts, but a newly identified area of interest may not be related to the user's current whereabouts; a user may be located in Los Angeles while searching for something in New York, for example. Accordingly, the suggestion engine may deselect previously identified filters and/or local indexes.

Figure 12:
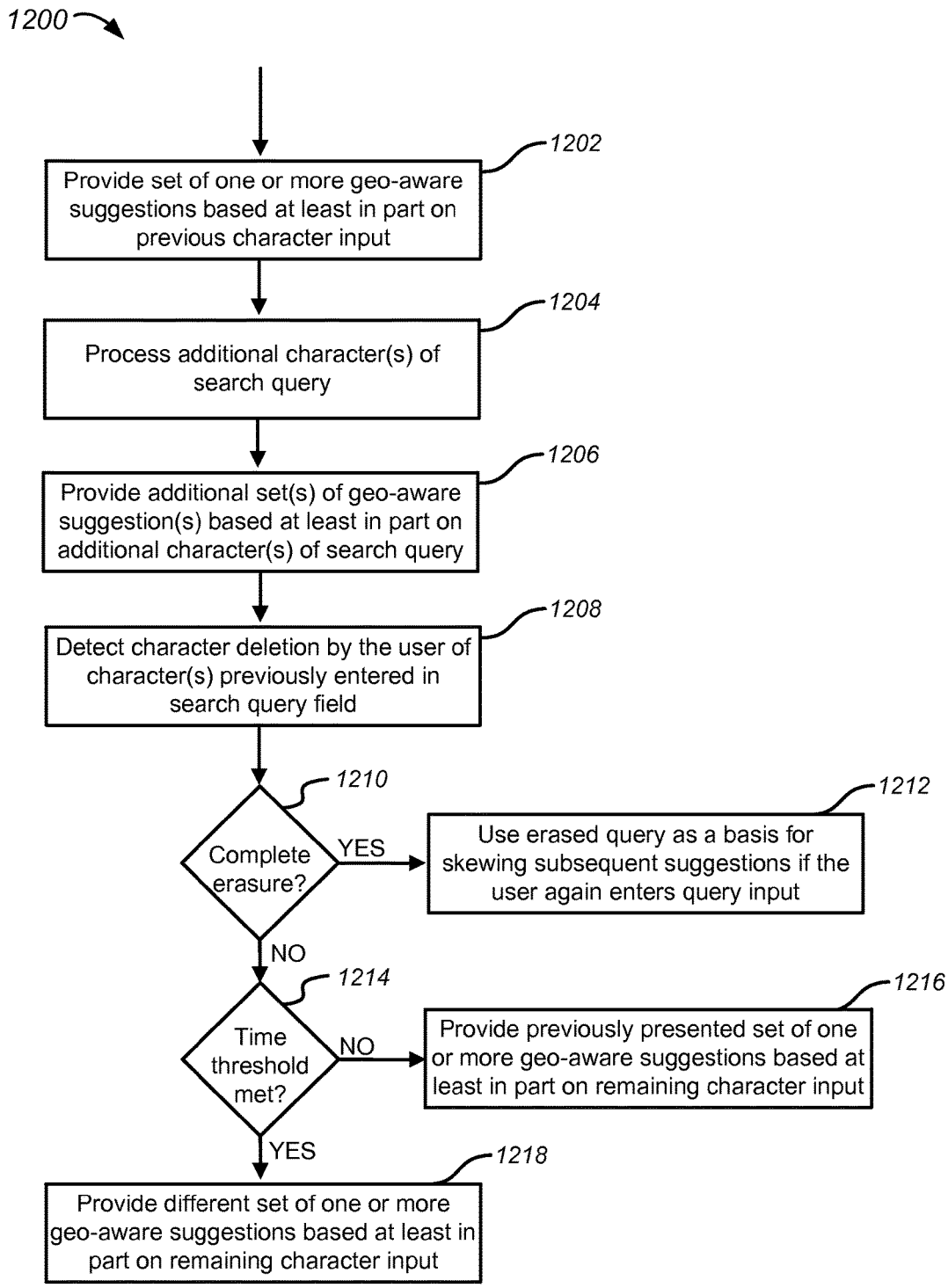
FIG. 12 illustrates an example subprocess directed to dynamic features for geo-aware autosuggestion in view of user-specific search activity, in accordance with certain embodiments of the present disclosure.

As indicated by block 1128, one or more filters and/or local indexes corresponding to the second set of one or more areas of interest may be determined. The process flow may then transition back to block 1118. And the process may continue in view of the newly selected filters and/or local indexes. Though not depicted, in some embodiments, the applicable spelling correction(s) may be determined in view of the different area of interest, in accordance with any one or combination of embodiments discussed herein. Thus, the one or more geo-aware suggestions may be determined at least partially based on applicable spelling correction(s) specific to the second area of interest. Then, in embodiments where one or more local indexes are employed, a lookup in the one or more local indexes may be performed with the current state of the search string FIG. 12 illustrates an example subprocess 1200 directed to dynamic features for geo-aware autosuggestion in view of user-specific search activity, in accordance with certain embodiments of the present disclosure. The method could correspond to an extension of methods 900, 1100, and/or other methods in some embodiments. The method may proceed following a provision of a set of one or more geo-aware suggestions based at least in part on previous character input, as indicated by block 1202. As indicated by block 1204, additional character(s) input by the user for the search query may be processed. As indicated by block 1206, additional set(s) of one or more geo-aware suggestions based at least in part on additional character(s) of search query may be provided. As indicated by block 1208, character deletion by the user of character(s) previously entered in a search query field may be detected. For example, if a user backspaces to delete character(s) previously entered in a search query field, indication of the deletion may be transferred to the system 122.

In some embodiments, it may be determined whether the character deletion corresponds to a complete erasure of the previously presented characters, as indicated by block 1210. As indicated by block 1212, if the character deletion corresponds to a complete erasure of the previously presented characters, then erased query can be used as a basis for skewing subsequent suggestions in the event that the user again enters query input. Say, for example, that the previous query input is determined by the system to correspond to restaurants; that determination can be used to orient subsequent suggestions toward restaurants. In some cases, such user-specific adaptation can be useful within a particular time frame. For example, a user may be spending about three minutes in a searching session looking for restaurants, and the dynamically learned orientation toward restaurants may be applied with a certain time frame (say, a 12-minute time frame) to capitalize on that presumably temporary user interest. But, beyond a certain time threshold—say, for example, that the next time that the user searches is much later in the day—the dynamically learned orientation may not useful, unless a search pattern is identified as existing across search sessions of the particular user. For example, if the user repeatedly searches for restaurants or other food-based businesses on Fridays and/or Friday evenings, that pattern can be detected, logged, and used to the adapt suggestions to the user's specific periodic interest for future corresponding time periods.

In the event that the character deletion is determined not to have corresponded to complete erasure, process flow may proceed to block 1214. In some cases, a user may wish to see previously presented suggestions again, particularly if the user did not spend much time viewing the suggestions. Say, for example, the user is relatively fast at typing and went past one or more sets of suggestions quickly by typing more characters quickly such that user likely did not have sufficient time to consider the suggestions. Thus, in some embodiments, the previously presented suggestions may be again presented to the user based on the characters remaining after the deletion if the previous presentation time of the previously presented suggestions was relatively short.

In other cases, however, the previously presented suggestions may not have been helpful to the user, which is more likely the case the more time the user had to view the suggestions. Thus, in some embodiments, a different set of suggestions may be presented the user based on the characters remaining after the completion. Accordingly, as indicated by block 1214, it may be determined whether a time threshold has been met. Any suitable time threshold may be used. As indicated by block 1216, in the case that the time threshold is not met, the previously presented suggestions may be again presented to the user based on the characters remaining after the deletion. However, in the case that the time threshold is met, the process flow may proceed to block 1218. As indicated by block 1218, a different set of one or more geo-aware suggestions based at least in part on remaining character input may be provided.

In some embodiments, the different set may differ from the previously presented set by being the next relevant set of suggestions after the previously presented set according to the ordering of the relevance score of the suggestions. In some embodiments, the different set may differ from the previously presented set by being more general in nature by providing suggestions of business categories rather than of specific businesses. In some embodiments, the level of specificity of the different set may correspond to the level of specificity of the query characters as assessed prior to the deletion. Hence, if the previously presented set of suggestions was directed to specific businesses based on the query input characters being associated with that level of specificity, the subsequent different set may likewise be directed to specific businesses. And, if the previously presented set of suggestions was directed to business categories based on the query input characters being associated with that level of specificity, the subsequent different set may likewise be directed to business categories.

Figure 13:
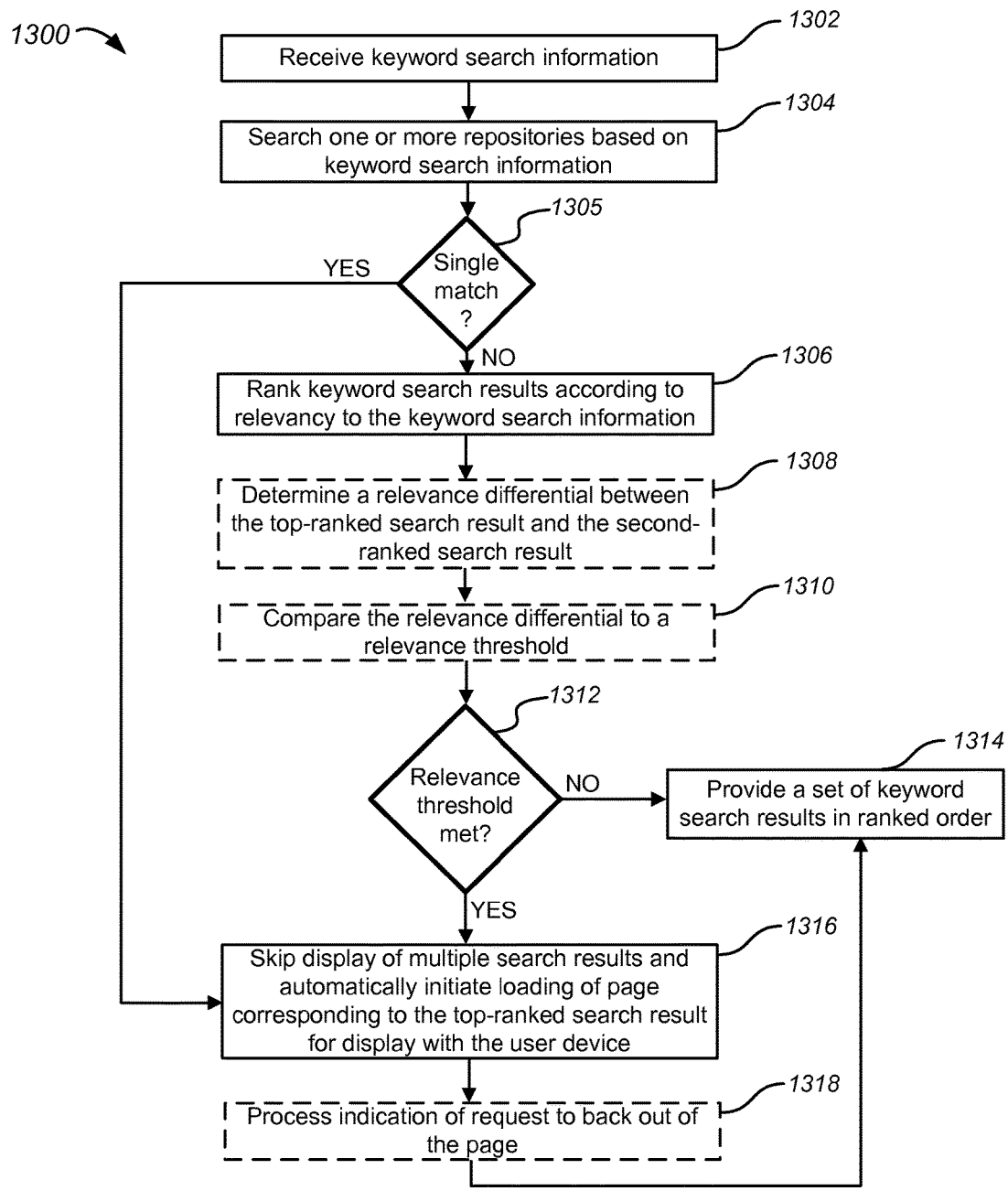
FIG. 13 illustrates an example method of searching with a differentiating search engine, in accordance with certain embodiments of the present disclosure.

FIG. 13 illustrates an example method 1300 of searching with a differentiating search engine, in accordance with certain embodiments of the present disclosure. According to some embodiments, the method 1300 may begin as indicated by 1302. As indicated by block 1302, keyword search information may be received. In some embodiments, the keyword search information may correspond to a suggestion that has been presented to and selected by a user via a user-selectable option, in accordance with certain embodiments herein.

As indicated by block 1304, one or more repositories may be search based on the keyword search information. For example, one or more of the data repositories 123 may be searched. In some embodiments, as in the case of the keyword search information being responsive to a suggestion, a search may be unnecessary as information may have been pre-identified and/or pre-loaded as part of the autosuggestion service.

As indicated by block 1305, it may be determined whether there is a single match in the data repositories 123 for the keyword search information. In some embodiments, as in the case of the keyword search information being responsive to a suggestion, the suggestion may have been pre-identified as corresponding to a single match. For example, an index entry may include a flag, tag, or other indicator of the single match attribute. However, in some instances, a suggestion may correspond to a category and/or multiple businesses/business locations such that there are multiple matching possibilities. In the case that there is a single match for the keyword search information, the process flow may proceed to block 616, which is discussed further herein. However, if a single match for the keyword search information is not identified, the process flow may proceed to block 1306.

As indicated by block 1306, keyword search results may be identified and ranked. The search results may be ranked according to relevancy to the keyword search information. Any suitable algorithm(s) for assessing relevancy and ranking the search results may be employed in various embodiments, such as, for example, using TF/IDF. And, thus, the ranking of the search results may be at least partially based on TF/IDF associated with the search results. In some embodiments, as in the case of the keyword search information being responsive to a suggestion that corresponds to a category and/or multiple businesses/business locations such that there are multiple matching possibilities, the possibilities may be ranked and ordered based at least in part on proximity.

As indicated by block 1308, in some embodiments, a relevance differential between the top-ranked search result and the second-ranked search result may be determined. A top-ranked search result may be identified from the ranked search results. The top-ranked search result may be the search result with the highest relevancy score. A search result with the next highest relevancy score may be identified as the second-ranked search result. The top-ranked search result and the second-ranked search result may be compared to determine a difference in the relevancy for each. For example, a difference in the relevancy scores for the search results may be determined.

As indicated by block 1310, in some embodiments, the relevance differential may be compared to a relevance threshold. The threshold may be any suitable threshold determined to correspond to an acceptable level of confidence that a given search result is acceptable for a search query. The threshold may vary depending on implementation. In some embodiments, the relevance threshold could be a pre-determined relevancy score. In some embodiments, the relevance threshold could be any suitable value according to which the relevance differential may be compared.

Alternative embodiments may be based on an absolute relevance indication, instead of a differential between two results. For example, a top-ranked search result may be identified and compared to the absolute relevance threshold, without considering the differential between the top-ranked and second-ranked results. The relevance threshold could be a pre-determined relevancy score.

As indicated by block 1312, it may be determined whether the relevance threshold is met. Accordingly, in some embodiments, the determination may be based on a relevancy differential and a corresponding differential threshold. And, in some embodiments, the determination may be based on an absolute relevancy score and a corresponding absolute threshold. In some embodiments, in the case of the keyword search information being responsive to a suggestion that corresponds to a category and/or multiple businesses/business locations such that there are multiple matching possibilities ranked and ordered based at least in part on proximity, the relevance threshold may be deemed met with the top-ranked possibility, considering that the autosuggestion service offers the most relevant suggestions by design.

As indicated by block 1314, in the case that the relevance threshold is not met, a set of the keyword search results may be selected, and the set may be provided in ranked order. However, in the case that the relevance threshold is met, the process flow may proceed to block 1316. As indicated by block 1316, a display of multiple search results may be skipped, and loading of a page corresponding to the top-ranked search result may be automatically initiated for display with the computing device. In some embodiments, the page may be a web page corresponding to the top-ranked search result. In some embodiments, the computing device may be automatically directed to a web page corresponding to the top-ranked search result such the page is automatically downloaded. For example, the computing device may be automatically directed to the web page of a business indicated as the top-ranked search result such that the web page is downloaded without user input beyond the original search query.

Figure 14:
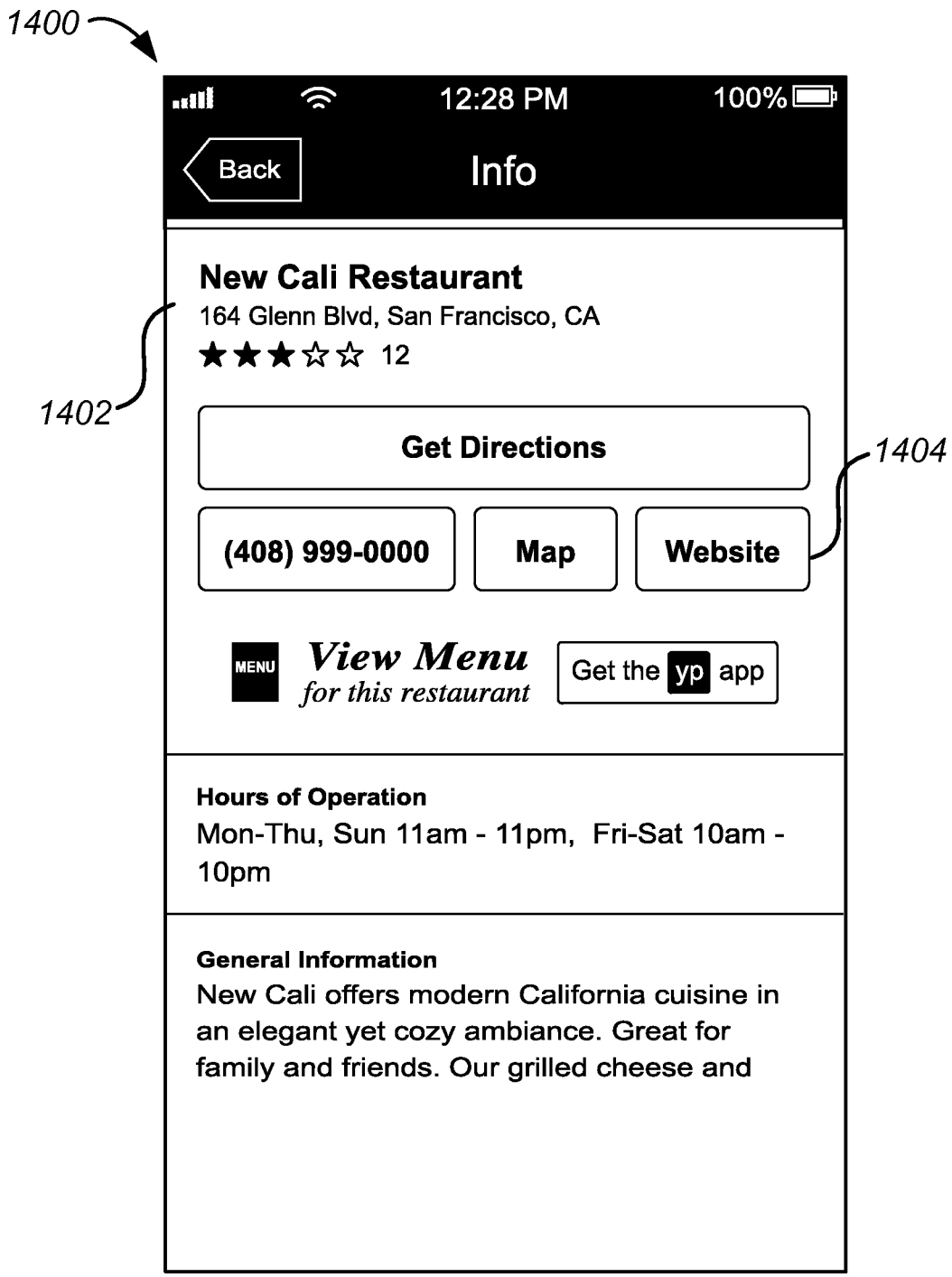
FIG. 14 shows a screenshot corresponding to certain embodiments showing one non-limiting example page for a mobile application embodiment.

FIG. 14 shows a screenshot 1400 corresponding to certain embodiments showing one non-limiting example page for a mobile application embodiment. The page may correspond to a top-ranked search result for a business listing 1402. The page may include directory information listing, with various listing information—such as ratings, reviews, business details, hours of operation, telephone number, and/or website address. The page may include a selectable reference 1404 linked to a website of the business. Alternative embodiments, whether browser-based implementations or mobile applications, may be configured to automatically present the website of the business, rather than a listing information page.

Referring again to FIG. 13, as indicated by block 1318, in some embodiments, an indication of a request from the user to back out of the page may be processed. And, in some embodiments, responsive to the indication of the request, the process flow may proceed to block 1314 such that a set of the keyword search results may be selected, and the set may be provided in ranked order. Alternative embodiments may not directly proceed to a results page, but may return to the query page in response to the indication of the request to back out of the page.

Figure 15:
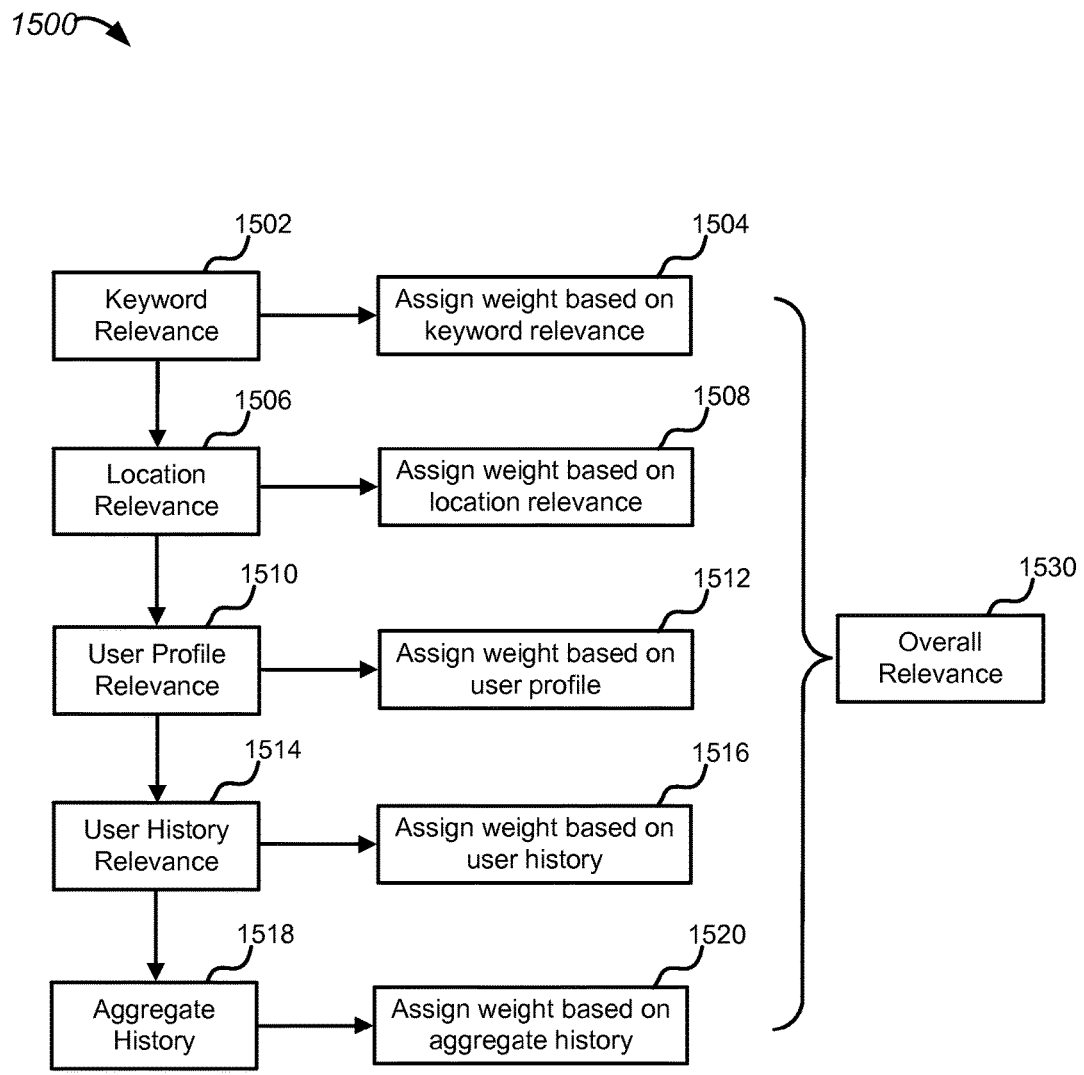
FIG. 15 illustrates an example functional model for searching with a differentiating search engine, in accordance with certain embodiments of the present disclosure.

FIG. 15 illustrates an example functional model 1500 for searching with a differentiating search engine, in accordance with certain embodiments of the present disclosure. In some embodiments, one or more aspects of the functional model 1500 may correspond to the processes indicated by block 1004, among others, of method 1000. In some embodiments, one or more aspects of the functional model 1500 may correspond to assessing/ranking/scoring relevance of suggestions and/or potential corrections in various embodiments discussed herein.

According to some embodiments, the functional model 1500 may begin as indicated by 1502. In some embodiments, the functional model 1500 may be implemented as a decision tree. As indicated by block 1502, keyword relevance may be determined for one or more datasets. For example, a dataset corresponding to a particular search result may be identified with the indexes 155. A given dataset may be identified by keyword and/or n-gram. In some embodiments, TF/IDF may be used to assess a particular dataset, such as a document, based on the inclusion of a particular word and/or n-gram in the particular dataset.

In some embodiments, the indexes 155 may be used to identify one or more potential keyword search results. In some embodiments, a search string corresponding to the keyword search information may be decomposed at the word level, and the indexes 155 may be searched for one or more datasets with one or more words in common with the search string. In some embodiments, the search string may be decomposed into n-grams of any suitable length, and the indexes 155 may be searched for one or more datasets with one or more n-grams in common with the search string. In some embodiments, the search string may be analyzed at least in part by identifying one or more corresponding prefixes. For example, a prefix of the search string may be identified for comparison, and one or more corresponding prefixes in the listing prefixes repository 150' may be identified based on the prefix of the search string. A TF/IDF may be determined with respect to the identified datasets.

Any suitable algorithm for assessing similarity may be employed. Some embodiments may identify intersections between multiple sets. Having set intersections identified, the intersections may be compared. A greater extent of an intersection, that is, a larger intersection, may be an indication of a greater degree of potential similarity between the corresponding sets. In some embodiments, the sets may be ranked according to the extent of the intersections.

As indicated by block 1504, a weight may be assigned to the one or more datasets based on keyword relevance. For example, a dataset corresponding to a particular search result may be associated with a relevancy score. The relevancy score may be result at least partially based on TF/IDF in some embodiments. An overall relevance may take into account the weight assigned to a search result based on the keyword relevance, as indicated by block 1530. And, thus, the ranking of the search results may be at least partially based on TF/IDF associated with the search results. In some embodiments, a TF/IDF may indicate a weight for weighted similarity measures. For example, sets of ranked intersections may be weighted in view of TF/IDF measures for each of the sets.

As indicated by block 1506, location relevance may be determined for one or more datasets. Location information may be processed at, by, and/or with the computing device 102 and/or the information handling system 106. In some embodiments, the location engine 156 may process information about a first location. The information may be gathered in any one or combination of ways in accordance with various embodiments discussed herein.

As indicated by block 1508, a weight may be assigned to the one or more datasets based on location relevance, and the weight may be taken into account with the overall relevance score, as indicated by block 1530. Any suitable criteria may be used to identify and assign a weight. In some embodiments, the weighting may be at least partially based on the degree of matching between the geographic area of interest to the user and a service area of an advertiser. For example, in some embodiments, when other conditions are the same, the further the advertiser is from the geographic area of interest, the lower the weight of the corresponding advertiser may be. In some embodiments, the weighting may be at least partially based on proximity of an advertiser to an area of interest that may encompass and/or be defined by/with respect to a metropolitan area, business district, and/or the like. In some embodiments, an area of interest may be defined at least in part by political, physical, and/or topographical map characteristics.

In various embodiments, the form of an area of interest may be more tailored to the specific needs of the user in some embodiments, e.g., by taking into account a user's direction of travel. An area of interest may be based on the user's direction of travel. The area of interest may be based on the likely routes the user may take. An area of interest may be defined at least in part by deviation. For example, the deviation could be a maximum distance from one or more routes from the origin. The deviation could be quantified in distance as the crow flies (i.e., the shortest distance between the origin and the destination), driving distance, and/or driving time. For example, the area of interest may exclude an area that, while being close to the main highway, would involve relatively greater deviation in driving time and distance.

As another example of taking into account a user's direction of travel, the area of interest may be a triangular or funnel-like shape, e.g., generally extending outward from the user's current location along the user's direction of travel may be most convenient for the user to minimize deviation from the user's currently traveled route. Such an area of interest may appropriate for relatively long and/or straight stretches of highway. An area of interest could exclude certain locales for any of a variety of reasons. For example, a high-crime area could be excluded. For example, the area of interest may exclude an area because it has a high rate of crime relative to other areas nearby or because of any suitable reason. Accordingly, one or more areas of interest may be used to assign a weight based on location relevance. For example, a weight may correspond to a proximity of an advertiser to one or more areas of interest, with greater extents of correspondence associated with greater weights.

As indicated by block 1510, a relevance to a user profile may be determined for one or more datasets. For example, in some embodiments, location information can be obtained from user preference data. The user profile may include user-indicated location information corresponding to a place of work, the user's home, or other locations of interest. The user profile may include other user-indicated information, such as preferences with respect to particular business categories and/or particular businesses that correspond to particular business categories. The user profile may include demographic information such as a sex, age or age range, and/or other suitable characteristics.

As indicated by block 1512, a weight may be assigned to the one or more datasets based on relevance to the user profile, and the weight may be taken into account with the overall relevance score, as indicated by block 1530. Any suitable criteria may be used to identify and assign a weight. In some embodiments, the weighting is partially based on the degree of matching between user-indicated location information and a service area of an advertiser. In some embodiments, the weighting is partially based on the degree of keyword matching between other user-indicated profile information and a search result.

As indicated by block 1514, a relevance to a user history may be determined for one or more datasets. A history of past interactions for a particular user and/or computing device may be compiled. In some embodiments, location information can be based at least partially on past experience with a particular user and/or computing device. For example, past inquiries may be stored and used for inferring location information. As another example, the last X number of inquiries from a particular user over a certain time period may have related to a particular geographic area or set of geographic areas, and such information may be stored as an indication of relevance. As yet another example, the past location information, automatically gathered and/or user-indicated, may be stored as an indication of relevance. If it is determined from a user history that the user has associated with a particular part of town, the association may be stored as an indication of relevance. For example, the user has associated with a particular affluent part of town, that association may be stored as an indication of relevance. If it is determined from a user history that the user has an interest in a particular listings category, such as restaurants, that interest may be stored as an indication of relevance.

As indicated by block 1516, a weight may be assigned to the one or more datasets based on relevance to the user history, with any suitable criteria being used to identify and assign a weight. In some embodiments, the weighting is partially based on the degree of matching, such as keyword matching, between user history information and a particular search result.

As indicated by block 1518, a relevance to an aggregate history may be determined for one or more datasets. For example, in some embodiments, the one or more data repositories 153 may store statistics of the tracked user interactions to determine an indicator of the level of user interest in a listing or category of listings 152. For example, query distribution can change over time. There can be seasonal distribution changes, weekly distribution changes, and daily distribution changes. Analyzing the query distributions may identify popular changes over a particular time period, such as any number of recent hours or days. For example, user interactions in a particular area may indicate an interest in a listing or category of listings 152 and/or that a certain listing or category of listings 152 is more popular than others. In some embodiments, popularity of a listing 152 among a set or subset of users, such as users of specific mobile computing device products, of a particular sex, of a particular age or age range, and/or having other suitable characteristics. The data repository 153 may store the statistics as logs of web access to the listings 150 and/or other information related to the listings 150. The data repository 153 may store the statistics in the form of counts of user interaction with listings 150.

In some embodiments, an indication of relevance of a search result may be based on past click information. For example, past click data for the original keyword search string could be mined from click logs. The number of clicks over time may be assessed for the search result(s) corresponding to the keyword search string. The clicks could correspond to one or more of clicks through to a particular website, invocation of a mapping application in view of a particular search result, a call to an advertiser or other contact derived from the search result, and/or the like. Any of various times periods may be used in various embodiments. For example without limitation, the time period for consideration could be the past year, the past 6 months, the past month, the past week, etc.

As indicated by block 1520, a weight may be assigned to the one or more datasets based on relevance to the aggregate history, and the weight may be taken into account with the overall relevance score, as indicated by block 1530. Any suitable criteria may be used to identify and assign a weight. In some embodiments, the weighting is partially based on the degree of matching, such as keyword matching, between user history information and a particular search result.

As indicated by block 1530, any one or combination of the weights assigned as indicated by blocks 1504, 1508, 1512, 1516, 1520 may be summed or otherwise used at least as a partial basis for deriving an overall relevance score. Any suitable scale may be used for the scoring. The overall relevance score(s) for one or more search results may be used for the assessments in method 1000 and/or assessing/ranking/scoring of suggestions and/or corrections in any one or combination of embodiments discussed herein.

Figure 16:
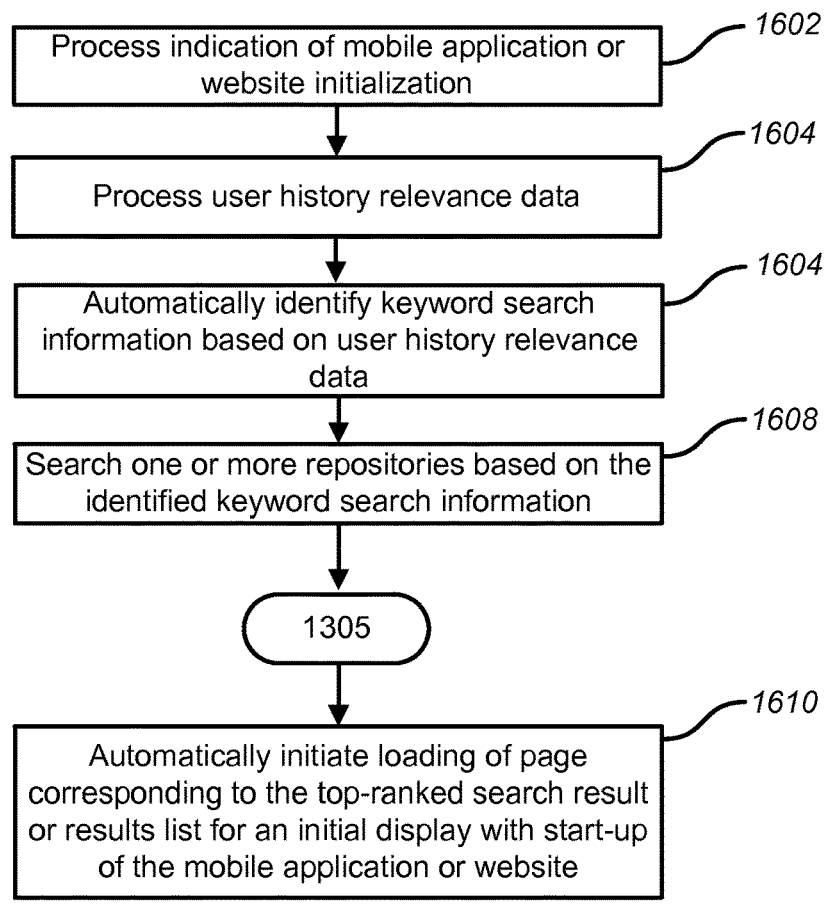
FIG. 16 illustrates an example method of searching with a differentiating search engine, in accordance with certain embodiments of the present disclosure.

FIG. 16 illustrates an example method 1600 of searching with a differentiating search engine, in accordance with certain embodiments of the present disclosure. According to some embodiments, the method 1600 may begin as indicated by 1602. Teachings of the present disclosure may be implemented in a variety of configurations that may correspond to systems described herein. As such, the order of the steps comprising the method 1600 may be shuffled in any suitable manner and may depend on the implementation chosen. Moreover, while the following steps may be separated for the sake of description, it should be understood that certain steps may be performed simultaneously or substantially simultaneously.

As indicated by block 1602, an indication of a mobile application or a website initialization may be received and processed, in some embodiments. In other embodiments, an indication of a website initialization may be received and processed. The indication of initialization may correspond to a user invoking the application or website.

As indicated by block 1604, user history relevance data may be processed. As indicated by block 1606, keyword search information may be automatically identified based on the user history relevance data. As such, the keyword search information may be identified responsive to initialization of the mobile application or website, or prior to initialization in some embodiments.

As discussed herein, a history of past interactions for a particular user and/or computing device may be compiled, and one or more characteristics of that user history may be stored as one or more indications of relevance. Past keyword search information may be analyzed to identify a particular keyword search of interest. For example, past keyword search information may be analyzed to identify a particular search string that the user has input, or a particular search string that corresponds to a category of past user searches. Say a particular user has a history of searching for pizza generally and/or Pizza House specifically during the evening hours. A keyword search string for pizza generally and/or Pizza House may be automatically selected based on the time of day that the mobile application or the website is initialized. Hence, certain embodiments may use a time of day as one basis for selecting a search string. In some embodiments, multiple keyword search strings may be ranked according to frequency of past searches, and the most frequent may be selected.

As indicated by block 1608, one or more repositories may be automatically searched based on the identified keyword search information. In various embodiments, this may be performed responsive to initialization of the mobile application or website, or prior to initialization in some embodiments. In the example above, say a user searched for pizza generally and/or Pizza House more frequently than other things during evening hours; in that case, one or more repositories may be searched for pizza and/or Pizza House.

As depicted, in some embodiments, the process flow may proceed to processes of method 1600. For example, the process flow may proceed to block 1605 of the method 1600. Accordingly, in some embodiments, a set of the keyword search results may be selected and provided, as indicated by block 1614. In some embodiments, a page corresponding to the top-ranked search result may be automatically initiated for display with the computing device, as indicated by block 1614. Further, referring again to method 1600, loading of the page corresponding to the top-ranked search result or the page for the results list for display may be automatically initiated for an initial display with start-up of the mobile application or the website. Thus, without further user interaction beyond invoking the mobile application or the website, a relevant page is displayed.

Figure 17:
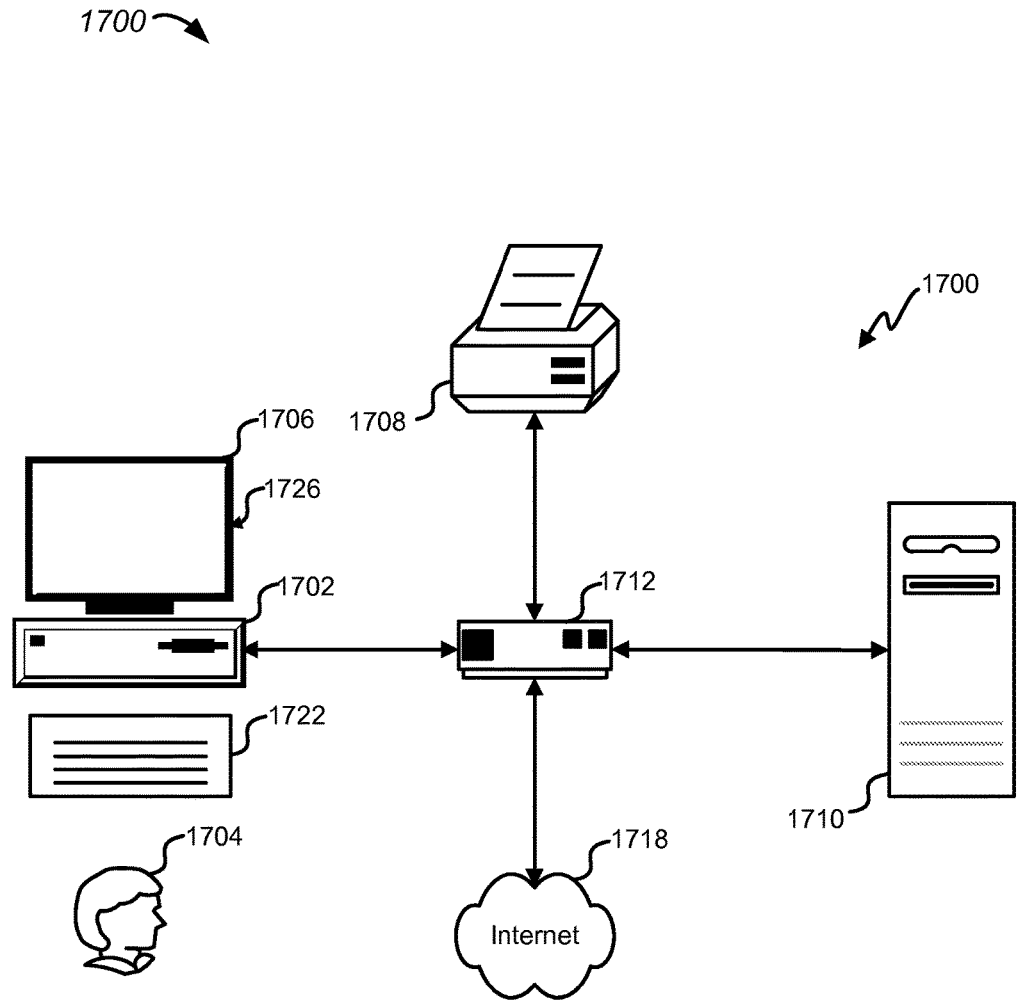
FIG. 17 depicts a block diagram of an embodiment of a computer system, in accordance with certain embodiments of the present disclosure.

Referring next to FIG. 17, an exemplary environment with which embodiments may be implemented is shown with a computer system 1700 that can be used by a designer 1704 to design, for example, electronic designs. The computer system 1700 can include a computer 1702, keyboard 1722, a network router 1712, a printer 1708, and a monitor 1706. The monitor 1706, processor 1702 and keyboard 1722 are part of a computer system 1726, which can be a laptop computer, desktop computer, handheld computer, mainframe computer, etc. The monitor 1706 can be a CRT, flat screen, etc.

A designer 1704 can input commands into the computer 1702 using various input devices, such as a mouse, keyboard 1722, track ball, touch screen, etc. If the computer system 1700 comprises a mainframe, a designer 1704 can access the computer 1702 using, for example, a terminal or terminal interface. Additionally, the computer system 1726 may be connected to a printer 1708 and a server 1710 using a network router 1712, which may connect to the Internet 1718 or a WAN.

The server 1710 may, for example, be used to store additional software programs and data. In some embodiments, software implementing the systems and methods described herein can be stored on a storage medium in the server 1710. Thus, the software can be run from the storage medium in the server 1710. In another embodiment, software implementing the systems and methods described herein can be stored on a storage medium in the computer 1702. Thus, the software can be run from the storage medium in the computer system 1726. Therefore, in this embodiment, the software can be used whether or not computer 1702 is connected to network router 1712. Printer 1708 may be connected directly to computer 1702, in which case, the computer system 1726 can print whether or not it is connected to network router 912.

Figure 18:
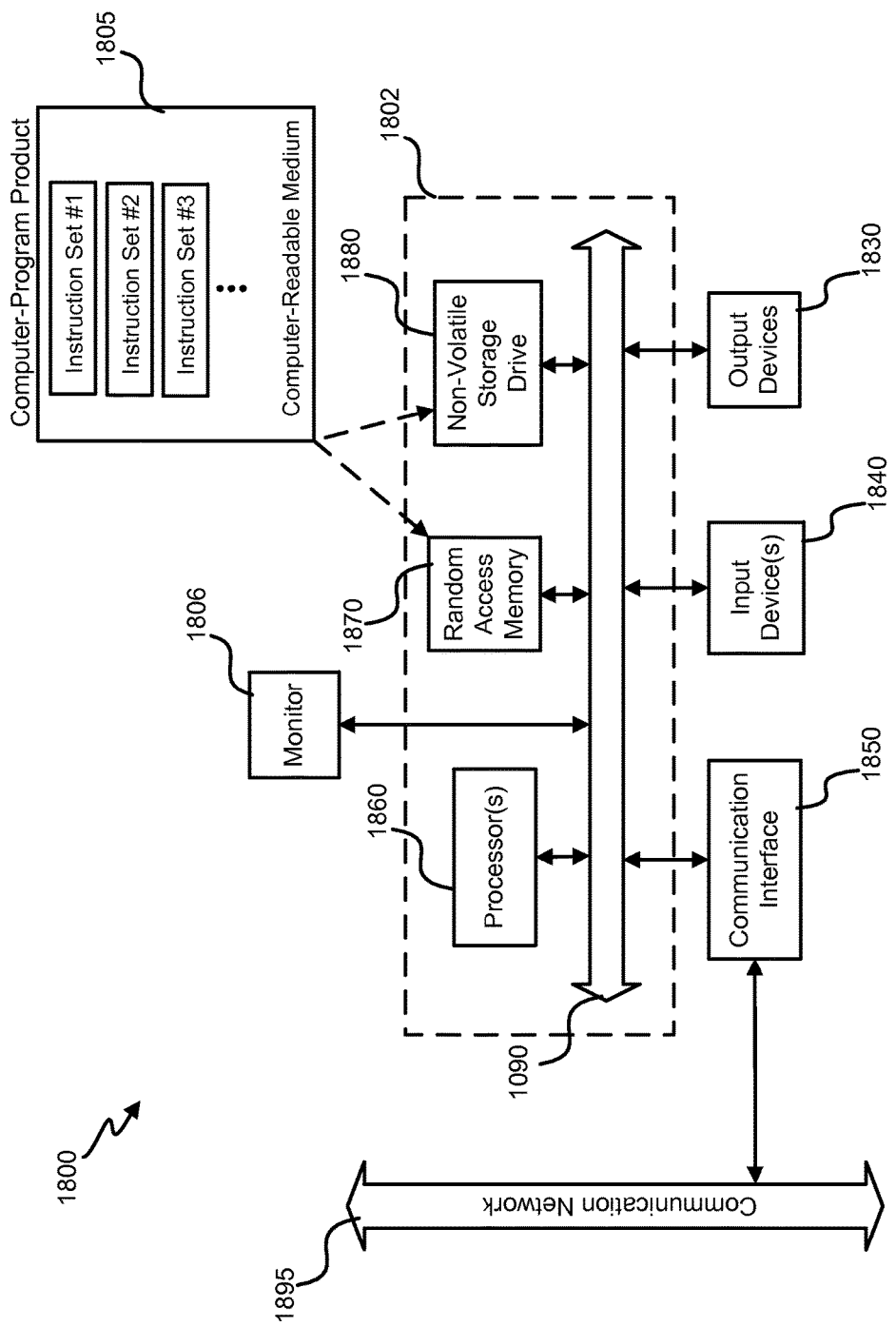
FIG. 18 depicts a block diagram of an embodiment of a special-purpose computer system, in accordance with certain embodiments of the present disclosure.

With reference to FIG. 18, an embodiment of a special-purpose computer system 104 is shown. The above methods may be implemented by computer-program products that direct a computer system to perform the actions of the above-described methods and components. Each such computer-program product may comprise sets of instructions (codes) embodied on a computer-readable medium that directs the processor of a computer system to perform corresponding actions. The instructions may be configured to run in sequential order, or in parallel (such as under different processing threads), or in a combination thereof. After loading the computer-program products on a general purpose computer system 1726, it is transformed into the special-purpose computer system 104.

Special-purpose computer system 104 comprises a computer 1702, a monitor 1706 coupled to computer 1702, one or more additional user output devices 1830 (optional) coupled to computer 1702, one or more user input devices 1840 (e.g., keyboard, mouse, track ball, touch screen) coupled to computer 1702, an optional communications interface 1850 coupled to computer 1702, a computer-program product 1805 stored in a tangible computer-readable memory in computer 1702. Computer-program product 1805 directs system 104 to perform the above-described methods. Computer 1702 may include one or more processors 1860 that communicate with a number of peripheral devices via a bus subsystem 1890. These peripheral devices may include user output device(s) 1830, user input device(s) 1840, communications interface 1850, and a storage subsystem, such as random access memory (RAM) 1870 and non-volatile storage drive 1880 (e.g., disk drive, optical drive, solid state drive), which are forms of tangible computer-readable memory.

Computer-program product 1805 may be stored in non-volatile storage drive 1880 or another computer-readable medium accessible to computer 1702 and loaded into memory 1870. Each processor 1860 may comprise a microprocessor, such as a microprocessor from Intel® or Advanced Micro Devices, Inc.®, or the like. To support computer-program product 1805, the computer 1702 runs an operating system that handles the communications of product 1805 with the above-noted components, as well as the communications between the above-noted components in support of the computer-program product 1805. Exemplary operating systems include Windows® or the like from Microsoft® Corporation, Solaris® from Oracle®, LINUX, UNIX, and the like.

User input devices 1840 include all possible types of devices and mechanisms to input information to computer system 1702. These may include a keyboard, a keypad, a mouse, a scanner, a digital drawing pad, a touch screen incorporated into the display, audio input devices such as voice recognition systems, microphones, and other types of input devices. In various embodiments, user input devices 1840 are typically embodied as a computer mouse, a trackball, a track pad, a joystick, wireless remote, a drawing tablet, a voice command system. User input devices 1840 typically allow a user to select objects, icons, text and the like that appear on the monitor 1706 via a command such as a click of a button or the like. User output devices 1830 include all possible types of devices and mechanisms to output information from computer 1702. These may include a display (e.g., monitor 1706), printers, non-visual displays such as audio output devices, etc.

Communications interface 1850 provides an interface to other communication networks and devices and may serve as an interface to receive data from and transmit data to other systems, WANs and/or the Internet 1718. Embodiments of communications interface 1050 typically include an Ethernet card, a modem (telephone, satellite, cable, ISDN), a (asynchronous) digital subscriber line (DSL) unit, a FireWire® interface, a USB® interface, a wireless network adapter, and the like. For example, communications interface 1850 may be coupled to a computer network, to a FireWire® bus, or the like. In other embodiments, communications interface 1850 may be physically integrated on the motherboard of computer 1702, and/or may be a software program, or the like.

RAM 1870 and non-volatile storage drive 1880 are examples of tangible computer-readable media configured to store data such as computer-program product embodiments of the present invention, including executable computer code, human-readable code, or the like. Other types of tangible computer-readable media include floppy disks, removable hard disks, optical storage media such as CD-ROMs, DVDs, bar codes, semiconductor memories such as flash memories, read-only-memories (ROMs), battery-backed volatile memories, networked storage devices, and the like. RAM 1870 and non-volatile storage drive 1880 may be configured to store the basic programming and data constructs that provide the functionality of various embodiments of the present invention, as described above.

Software instruction sets that provide the functionality of the present invention may be stored in RAM 1870 and non-volatile storage drive 1880. These instruction sets or code may be executed by the processor(s) 1060. RAM 1870 and non-volatile storage drive 1880 may also provide a repository to store data and data structures used in accordance with the present invention. RAM 1870 and non-volatile storage drive 1080 may include a number of memories including a main random access memory (RAM) to store of instructions and data during program execution and a read-only memory (ROM) in which fixed instructions are stored. RAM 1870 and non-volatile storage drive 1080 may include a file storage subsystem providing persistent (non-volatile) storage of program and/or data files. RAM 1870 and nonvolatile storage drive 1880 may also include removable storage systems, such as removable flash memory.

Bus subsystem 1890 provides a mechanism to allow the various components and subsystems of computer 1702 communicate with each other as intended. Although bus subsystem 1890 is shown schematically as a single bus, alternative embodiments of the bus subsystem may utilize multiple busses or communication paths within the computer 1702.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the invention.

That which is claimed:

1. A method for providing geo-aware auto-suggestions for a search engine, the method comprising:
processing, by a computing system, one or more characters corresponding to user input, via a user interface, for a search query to a searching service, wherein the processing is prior to completion of the search query, and wherein the searching service comprises one or more information repositories retaining business listing information about a plurality of businesses;
detecting, by the computing system, a geographical location of an end-user device;
processing, by the computing system, information about the detected geographical location of the end-user device;

automatically determining, by the computing system, a geographical area of interest in response to detecting the geographical location of the end-user device;

detecting, by the computing system, one or more potential spelling corrections to at least a portion of the search query based at least in part on (a) the one or more characters of the user input corresponding to the search query being detected in real-time prior to completion of the search query, and (b) the determined geographical area of interest;

automatically determining, by the computing system, one or more geo-specific suggestions at least partially based on (a) determining a relevancy of the at least the portion of the search query to the determined geographical area of interest and/or (b) a selected correction of the one or more potential spelling corrections to the at least the portion of the search query presented via the user interface, wherein:

the one or more geo-specific suggestions correspond to one or more detected locations of identified businesses in the determined geographical area of interest; and automatically, by the computing system, presenting visible indicia of at least one of the one or more geo-specific suggestions, to the user interface of a display device of the end-user device, as a user-selectable option, by at least one user of the end-user device, to complete the search query in a search query field for a search engine and/or submission of the at least one of the one or more geo-specific suggestions to the search engine as a selected search query.

2. The method for providing geo-aware auto-suggestions for the search engine of claim 1, wherein the processing is prior to user entry of additional characters subsequent to the one or more characters corresponding to the search query.

3. The method for providing geo-aware auto-suggestions for the search engine of claim 1, wherein the user-selectable option is presented as a type-ahead user-selectable option in the search query field.

4. The method for providing geo-aware auto-suggestions for the search engine of claim 1, wherein the determining the one or more geo-specific suggestions further comprises determining one or more relevancies of the one or more potential spelling corrections to the geographical area of interest.

5. The method for providing geo-aware auto-suggestions for the search engine of claim 1, wherein the determining the one or more geo-specific suggestions further comprises assigning one or more relevancy scores to the one or more identified businesses located in the geographical area of interest and to the one or more potential spelling corrections.

6. The method for providing geo-aware auto-suggestions for the search engine of claim 1, wherein:

at least one of the one or more geo-specific suggestions is based at least in part on the at least the portion of the search query and is indicated as a first user-selectable option to complete the search query; and at least one of the one or more geo-specific suggestions is based at least in part on the one or more potential spelling corrections to the at least the portion of the search query, and is indicated as a second user-selectable option to complete the search query.

7. The method for providing geo-aware auto-suggestions for the search engine of claim 1, further comprising:

determining whether to generate a list of search results for display or to select for display a page that corresponds to a single search result, the determination being at least partially based on whether a selection corresponding to the at least one of the one or more geo-specific suggestions is made.

8. The method for providing geo-aware auto-suggestions for the search engine of claim 1, wherein:

at least one of the one or more potential spelling corrections to at least a portion of the search query corresponds to at least one of removing and replacing a character of the one or more characters of the user input.

9. A system to provide geo-aware auto-suggestions for a search engine, comprising:

one or more network interfaces configured to provide access to one or more networks;

one or more storage media coupled to one or more processors to retain instructions;

the one or more processors coupled to the one or more network interfaces, the one or more processors to execute the instructions to:

process one or more characters corresponding to user input, via a user interface, for a search query to a searching service, wherein the processing is prior to completion of the search query, and wherein the searching service comprises one or more information repositories retaining business listing information about a plurality of businesses;

detect a geographical location of an end-user computing device;

process information about the detected geographical location of the end-user computing device;

automatically determine a geographical area of interest in response to detecting the geographical location of the end-user computing device;

detect one or more potential spelling corrections to at least a portion of the search query based at least in part on (a) the one or more characters of the user input corresponding to the search query being detected in real-time prior to completion of the search query, and (b) the determined geographical area of interest;

automatically determine one or more geo-specific suggestions at least partially based on (a) determining a relevancy of the at least the portion of the search query to the determined geographical area of interest and/or (b) a selected correction of the one or more potential spelling corrections to the at least the portion of the query presented via the user interface, wherein:

the one or more geo-specific suggestions correspond to one or more detected locations of identified businesses in the determined geographical area of interest; and automatically present visible indicia of at least one of the one or more geo-specific suggestions, to the user interface of a display device of the end-user computing device, as a user-selectable option, by at least one user of the end-user computing device, to complete the search query in a search query field for a search engine and/or submission of the at least one of the one or more geo-specific suggestions to the search engine as a selected search query.

10. The system to provide geo-aware auto-suggestions for the search engine of claim 9, wherein the processing is prior to user entry of additional characters subsequent to the one or more characters corresponding to the search query.

11. The system to provide geo-aware auto-suggestions for the search engine of claim 9, wherein the user-selectable option is presented as a type-ahead user-selectable option in the search query field.

12. The system to provide geo-aware auto-suggestions for the search engine of claim 9, wherein the determining the one or more geo-specific suggestions further comprises determining one or more relevancies of the one or more potential spelling corrections to the geographical area of interest.

13. The system to provide geo-aware auto-suggestions for the search engine of claim 9, wherein the determining the one or more geo-specific suggestions further comprises assigning one or more relevancy scores to the at least the portion of the search query and to the one or more potential spelling corrections.

14. The system to provide geo-aware auto-suggestions for the search engine of claim 9, wherein:
at least one of the one or more geo-specific suggestions is based at least in part on the at least the portion of the search query and is indicated as a first user-selectable option to complete the search query; and
at least one of the one or more geo-specific suggestions is based at least in part on the one or more potential spelling corrections to the at least the portion of the search query, and is indicated as a second user-selectable option to complete the search query.

15. The system to provide geo-aware auto-suggestions for the search engine of claim 9, the one or more processors to further execute instructions to:
determine whether to generate a list of search results for display or to select for display a page that corresponds to a single search result, the determination being at least partially based on whether a selection corresponding to the at least one of the one or more geo-specific suggestions is made.

16. The system to provide geo-aware auto-suggestions for the search engine of claim 9, wherein:
at least one of the one or more potential spelling corrections to at least a portion of the search query corresponds to at least one of removing and replacing a character of the one or more characters of the user input.

17. One or more non-transitory machine-readable media having machine-readable instructions thereon which, when executed by one or more computers or other processing devices, cause the one or more computers or other processing devices to:
process one or more characters corresponding to user input for a search query to a searching service, wherein the processing is prior to completion of the search query, and wherein the searching service comprises one or more information repositories retaining business listing information about a plurality of businesses;
detect a geographical location of an end-user computing device;
process information about the detected geographical location of the end-user computing device;
automatically determine a geographical area of interest at least partially based on the information about the geographical location;
detect one or more potential spelling corrections to at least a portion of the search query based at least in part on (a) the one or more characters of the user input corresponding to the search query being detected in real-time prior to completion of the search query, and (b) the determined geographical area of interest;
automatically determine one or more geo-specific suggestions at least partially based on (a) determining a relevancy of the at least the portion of the search query to the determined geographical area of interest and/or (b) a selected correction of the one or more potential spelling corrections to the at least the portion of the search query presented via the user interface, wherein:
the one or more geo-specific suggestions correspond to one or more detected locations of identified businesses in the determined geographical area of interest; and
automatically present visible indicia of at least one of the one or more geo-specific suggestions, to the user interface of a display device of the end-user computing device, as a user-selectable option, by at least one user of the end-user computing device, to complete the search query in a search query field for a search engine and/or submission of the at least one of the one or more geo-specific suggestions to the search engine as a selected search query.

18. The one or more non-transitory machine-readable media of claim 17, wherein the processing is prior to user entry of additional characters subsequent to the one or more characters corresponding to the search query.

19. The one or more non-transitory machine-readable media of claim 17, wherein the user-selectable option is presented as a type-ahead user-selectable option in the search query field.

20. The one or more non-transitory machine-readable media of claim 17, wherein the determining the one or more geo-specific suggestions further comprises determining one or more relevancies of the one or more potential spelling corrections to the geographical area of interest.

21. The one or more non-transitory machine-readable media of claim 17, wherein the determining the one or more geo-specific suggestions further comprises assigning one or more relevancy scores to the at least the portion of the search query and to the one or more potential spelling corrections.

22. The one or more non-transitory machine-readable media of claim 17, wherein:
at least one of the one or more geo-specific suggestions is based at least in part on the at least the portion of the search query and is indicated as a first user-selectable option to complete the search query; and
at least one of the one or more geo-specific suggestions is based at least in part on the one or more potential spelling corrections to the at least the portion of the search query, and is indicated as a second user-selectable option to complete the search query.

23. The one or more non-transitory machine-readable media of claim 17, wherein:
at least one of the one or more potential spelling corrections to at least a portion of the search query corresponds to at least one of removing and replacing a character of the one or more characters of the user input.

* * * * *